United States Patent
Okada et al.

(10) Patent No.: US 9,638,120 B2
(45) Date of Patent: May 2, 2017

(54) CONTROL DEVICE FOR AN INTERNAL COMBUSTION ENGINE PREVENTING CONDENSATION OF INTAKE GAS IN AN INTERCOOLER

(71) Applicant: TOYOTA JIDOSHA KABUSHIKI KAISHA, Toyota-shi, Aichi-ken (JP)

(72) Inventors: Yoshihiro Okada, Susono (JP); Shu Kobayashi, Gotemba (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 15/036,070

(22) PCT Filed: Nov. 7, 2014

(86) PCT No.: PCT/IB2014/002377
§ 371 (c)(1),
(2) Date: May 12, 2016

(87) PCT Pub. No.: WO2015/071723
PCT Pub. Date: May 21, 2015

(65) Prior Publication Data
US 2016/0265458 A1    Sep. 15, 2016

(30) Foreign Application Priority Data
Nov. 12, 2013  (JP) ................. 2013-234172

(51) Int. Cl.
*F01N 3/02* (2006.01)
*F02D 41/00* (2006.01)
(Continued)

(52) U.S. Cl.
CPC ....... *F02D 41/0072* (2013.01); *F01N 3/0814* (2013.01); *F01N 3/0842* (2013.01);
(Continued)

(58) Field of Classification Search
CPC ............. F02D 41/0065; F02D 41/0275; F02D 41/005; F02D 41/0055; F01N 3/0842;
(Continued)

(56) References Cited

U.S. PATENT DOCUMENTS

2008/0133110 A1* 6/2008 Vetrovec ............. F02B 29/0412
701/103
2009/0308071 A1* 12/2009 Yamashita .......... F02B 29/0418
60/602
(Continued)

FOREIGN PATENT DOCUMENTS

DE  2213859 B1 * 3/2016 .......... F02B 29/0443
EP  1496221 A2    1/2005
(Continued)

*Primary Examiner* — Jason Shanske
(74) *Attorney, Agent, or Firm* — Andrews Kurth Kenyon LLP

(57) ABSTRACT

A control device for an internal combustion engine includes an intake gas compressor, a cooling water circuit, an intercooler and an EGR device. An ECU is configured to: (a) control the temperature, of the cooling water of the intercooler to a target temperature in a specified external air state in which an external air temperature and an external air humidity are a specified temperature and a specified humidity, the target temperature being the temperature of the cooling water of the intercooler required for ensuring a specified performance in the specified external air state; and (b) control the EGR device based on an EGR rate mapping of the EGR rate. The EGR rate mapping being set so that a dew point of gas flowing into the intercooler does not exceed the target temperature.

10 Claims, 12 Drawing Sheets

(51) Int. Cl.

| | | |
|---|---|---|
| *F02D 41/02* | (2006.01) | |
| *F02B 29/04* | (2006.01) | |
| *F01P 3/20* | (2006.01) | |
| *F02M 26/06* | (2016.01) | |
| *F02M 26/50* | (2016.01) | |
| *F02M 26/22* | (2016.01) | |
| *F02M 26/20* | (2016.01) | |
| *F02M 26/33* | (2016.01) | |
| *F01N 3/08* | (2006.01) | |
| *F02D 41/26* | (2006.01) | |
| *F02M 35/10* | (2006.01) | |

(52) U.S. Cl.
CPC ............ *F01P 3/20* (2013.01); *F02B 29/0443* (2013.01); *F02B 29/0462* (2013.01); *F02B 29/0493* (2013.01); *F02D 41/005* (2013.01); *F02D 41/0055* (2013.01); *F02D 41/0065* (2013.01); *F02D 41/0235* (2013.01); *F02D 41/0275* (2013.01); *F02D 41/26* (2013.01); *F02M 26/06* (2016.02); *F02M 26/20* (2016.02); *F02M 26/22* (2016.02); *F02M 26/33* (2016.02); *F02M 26/50* (2016.02); *F02M 35/1038* (2013.01); *F02M 35/10157* (2013.01); *F02M 35/10222* (2013.01); *F02M 35/10268* (2013.01); *F02M 35/10393* (2013.01); *F01P 2060/02* (2013.01); *F02D 41/0007* (2013.01); *F02D 41/0255* (2013.01); *F02D 2200/0414* (2013.01); *F02D 2200/0418* (2013.01); *F02D 2200/0802* (2013.01); *F02D 2200/101* (2013.01); *Y02T 10/146* (2013.01); *Y02T 10/47* (2013.01)

(58) Field of Classification Search
CPC . F02B 29/0443; F02B 29/0462; F02M 26/06; F02M 26/50
USPC .......................................................... 60/311
See application file for complete search history.

(56) References Cited

U.S. PATENT DOCUMENTS

| | | | |
|---|---|---|---|
| 2012/0012088 A1 | | 1/2012 | Jung |
| 2012/0090584 A1* | | 4/2012 | Jung .................. F02D 41/0065 123/568.12 |
| 2013/0145748 A1* | | 6/2013 | Shimizu ............... F02M 25/032 60/274 |

FOREIGN PATENT DOCUMENTS

| | | | | |
|---|---|---|---|---|
| GB | 2391587 A | * | 2/2004 | .......... F02B 29/0418 |
| JP | 2009-174444 A | | 8/2009 | |
| JP | 2012-021524 A | | 2/2012 | |
| JP | 2012-219687 A | | 11/2012 | |

\* cited by examiner

CONTROL DEVICE FOR AN INTERNAL COMBUSTION ENGINE PREVENTING CONDENSATION OF INTAKE GAS IN AN INTERCOOLER

CROSS-REFERENCE TO RELATED APPLICATIONS

This is a national phase application based on the PCT International Patent Application No. PCT/IB2014/002377 filed Nov. 7, 2014, claiming priority to Japanese Patent Application No. 2013-234172 filed Nov. 12, 2013, the entire contents of both of which are incorporated herein by reference.

BACKGROUND OF THE INVENTION

1. Field of the Invention

The present invention relates to a control device for an internal combustion engine, and in particular relates to a control device for an internal combustion engine with an EGR device and a supercharger. The EGR device enables a portion of the exhaust gas to flow back to an intake passage closer to the upstream side as compared with a water-cooled intercooler.

2. Description of Related Art

Previously, for example, Japanese Patent Application Publication No. 2012-21524 (JP 2012-21524A) disclosed a control device for an internal combustion engine with a LPL (Low Pressure Loop) EGR (Exhaust Gas Recirculation) device and a turbocharger. In the previous internal combustion engine, EGR gas from the low pressure loop EGR device is supplied to an intake passage closer to the upstream side as compared with a compressor of the turbocharger. Based on this, in the above-mentioned control device, if it is determined that the temperature of the external air is higher than a specified temperature and the humidity of the external air is relatively high, the operation of the low pressure loop EGR device is limited.

SUMMARY OF THE INVENTION

Generally, an EGR rate mapping of an EGR rate is preset according to the relationship with an operating state (load and engine speed) in an internal combustion engine, and the target value of the EGR rate controlled during operation is obtained according to the EGR rate mapping. The mapping value of the EGR rate mapping is set in view of the fuel efficiency, exhaust gas emission and the like of the internal combustion engine. The dew point of gas containing EGR gas changes based on the EGR rate. That is, the easiness of generation of condensed water in a water-cooled intercooler changes not only based on the temperature and humidity of external air, but also based on the EGR rate. Moreover, the easiness of generation of the condensed water in the water-cooled intercooler also varies with the operating state. Thus, in order that an appropriate temperature at which the condensed water is not produced is achieved in the intercooler, it is considered to adjust the temperature of cooling water in the intercooler according to the operating state. However, it is afraid that the following problems may arise with this control method. That is, when the operating state is changed within a relatively short time period, if time is consumed before the temperature of the cooling water in the intercooler is changed into the temperature at which the condensed water is not produced in a transited operating state, the timing for introducing the EGR gas with an EGR rate appropriate for the transited operating state will be delayed. In addition, in the case where it is requested to transit from an operating state in which the temperature of the cooling water is set to relatively high to an operating state in which high output is required so as to prevent the formation of the condensed water, it is not possible to perfectly ensure the high output during the response delay until the temperature of the cooling water decreases to a value required for performing a relatively high power performance requested in the transited operating state. As mentioned above, due to the response delay of water temperature control, the time of bringing out the potential of desired power performance, fuel efficiency and exhaust gas emission performance in the transited operating state may be substantially limited.

The present invention provides a control device for an internal combustion engine, which can inhibit the formation of condensed water in an intercooler while ensuring specified performance values and can bring out the potential of various performances of the internal combustion engine regardless of the response delay of water temperature control.

The control device for the internal combustion engine according to one technical solution of the present invention comprises a compressor, a first cooling circuit, an intercooler, an EGR device and an ECU (electronic control unit). The compressor is arranged in an intake passage of the internal combustion engine. The compressor is configured to supercharge gas flowing in the intake passage. The first cooling water circuit is configured to circulate cooling water. The intercooler is arranged in the intake passage closer to q downstream side as compared with the compressor. The intercooler is configured to exchange heat between the gas flowing in the intake passage and the cooling water circulated in the first cooling water circuit. The EGR device is configured to adjust an EGR rate of the EGR gas for supplying a portion of the exhaust gas flowing in the exhaust passage of the internal combustion engine to the intake passage closer to an upstream side as compared with the intercooler. The ECU is configured to: (a) control the temperature of the cooling water of the intercooler to a target temperature in a specified external air state in which an external air temperature and an external air humidity are a specified temperature and a specified humidity, the target temperature being the temperature of the cooling water of the intercooler required for ensuring a specified performance in the specified external air state; and (b) control the EGR device based on an EGR rate mapping in which the EGR rate is set according to a relationship with parameters for determining an operating state of the internal combustion engine. The EGR rate mapping is configured to set the EGR rates so that a dew point of cooler inflow gas flowing into the intercooler does not exceed the target temperature when the EGR gas is introduced by using the EGR device.

In a technical solution of the present invention, the parameters used in the EGR rate mapping may be engine load and engine speed. The EGR rate mapping may be configured to set the EGR rate with which the dew point of the cooler inflow gas is limited not to exceed the above-mentioned target temperature in a high load and high revolution speed operating region as a value of the EGR rate mapping.

By adopting the above-mentioned technical solution, the temperature of the cooling water in the intercooler, which can ensure the specified performance values in the specified external air state, is set as the target temperature of the cooling water in the intercooler, so it is not necessary to adjust the temperature of the cooling water based on the variation of the operating state of the internal combustion engine. In addition, as the EGR rate mapping, the EGR rate is set as a mapping value so that the dew point of the cooler inflow gas does not exceed the target temperature when the EGR gas is introduced. Thus, when operating in the specified external air state, dew is not formed in the intercooler in the case where the specified performance values is ensured, and the EGR gas can be introduced according to the preset EGR rate mapping (namely can be introduced-maximumly within a possible range). Therefore, the formation of condensed water in the intercooler can be inhibited, and the potential of various performances (power performance, fuel efficiency, exhaust gas emission performance and the like) of the internal combustion engine can be brought out regardless of the response delay of water temperature control.

In a technical solution of the present invention, the above-mentioned specified external air state may be a high-temperature state or humid state or high-temperature and humid state in which condensed water tends to be provided in the intercooler.

By adopting the above-mentioned technical solution, even in the external air state in which condensed water tends to be formed in the intercooler, the specified performance values can be ensured, and the introduction of the EGR gas according to the preset EGR rate mapping can also be ensured.

In a technical solution of the present invention, an external air temperature detector configured to detect or estimate external air temperature and an external air humidity detector configured to detect or estimate external air humidity are provided. The above-mentioned ECU may correct the above-mentioned target temperature based on the dew point of the cooler inflow gas corresponding to the current external air temperature and the current external air humidity when the external air temperature and the external air humidity are different from those in the above-mentioned specified external air state.

By adopting the above-mentioned technical solution, even if in the case where the external air state is different from the specified external air state, by correcting the target temperature of the cooling water based on the dew point of the cooler inflow gas varying along with the external air state, the formation, of condensed water in the intercooler can be prevented more reliably regardless of the variation of the EGR rate caused by the external air state. Thus, compared with the control method in which the EGR rate is appropriately corrected according to the external air state and the value of the EGR rate mapping so as to prevent the formation of condensed water during operation and various performances such as fuel efficiency and the like are ensured, complication of engine control can be avoided, and adaptive man-hour of various mappings required for the control method can be reduced. Moreover, the EGR rate is changed according to the external air state (one EGR rate mapping is applicable), so the deterioration of fuel efficiency due to the variation of the EGR rate can be prevented. In addition, compared with the variation of the operating state during operation, the variation of the external air state during operation of the internal combustion engine is very slow. Therefore, even if the temperature of the cooling water changes along with the change of the external air state, it is different from a control method in which the temperature of the cooling water is changed according to the operating state, and the response delay of the water temperature control is not a problem.

In a technical solution of the present invention, the above-mentioned ECU may control the above-mentioned EGR device to the EGR rate lower than the EGR rate obtained from the above-mentioned EGR rate mapping when the external air temperature and the external air humidity are within a temperature and humidity region of external air where the dew point of the cooler inflow gas is above the specified temperature upper limit.

By adopting the above-mentioned technical solution, by forming an external air state in which the dew point of the cooler inflow gas is relatively high, in the case where it is afraid that corrosion of an intercooler material occurs, the corrosion of intercooler material can be inhibited by decreasing the EGR rate so that it is not easy to form the condensed water and excessive high temperature of the cooling water can be avoided.

In a technical solution of the present invention, a second cooling water circuit and a heat exchanger may also be provided. The second cooling water circuit is arranged separately from the above-mentioned first cooling water circuit, and the above-mentioned internal combustion engine is cooled by using a circulation water of the second cooling water circuit. The heat exchanger may be configured to exchange heat between the second cooling water circulated in the second cooling water circuit and the cooling water circulated in the above-mentioned first cooling water circuit. The above-mentioned first cooling water circuit may include a radiator, a first cooling water bypass and a first flow path switcher. The radiator may be configured to cool the cooling water. The first cooling water bypass may be configured to bypass the radiator. The first flow path switcher may be configured to switch the flow path pattern of the cooling water between a flow path pattern in which the cooling water is introduced into the radiator and a flow path pattern in which the cooling water flows through the first cooling water bypass rather than the radiator.

For example, in the case where the external air temperature is low while traveling continuously with a low load, the heat for keeping the temperature of the cooling water higher than the dew point of the cooler inflow gas may not be supplied from the second cooling water to the cooling water. In this case, by adopting the above-mentioned technical solution, the flow path pattern in which the cooling water is not introduced into the radiator can be selected, so unnecessary heat dissipation by the radiator can be avoided. As a result, the cooling water can be kept at a higher temperature.

In a technical solution of the present invention, a second cooling water circuit and a heat exchanger may be further included. The second cooling water circuit is arranged separately from the above-mentioned first cooling water circuit, and the above-mentioned internal combustion engine is cooled by using a circulation water of the second cooling water circuit. The heat exchanger may be configured to exchange heat between the second cooling water circulated in the second cooling water circuit and the cooling water circulated in the above-mentioned first cooling water circuit. The above-mentioned first cooling water circuit may include a second cooling water bypass and a second flow path switcher. The second cooling water bypass may be configured to bypass the heat exchanger. The second flow path switcher may be configured to switch the flow path pattern of the cooling water between a flow path pattern in which the cooling water is introduced into the heat exchanger and a flow path pattern in which the cooling water flows through the second cooling water bypass rather than the heat exchanger.

For example, during high-load operation such as full-load operation, excessive heat is applied from the second cooling water to the cooling water, it is difficult to decrease the temperature of the low-temperature cooling water to a desired temperature, and the internal combustion engine may no longer output as desired. In this case, by adopting the above-mentioned technical solution, the flow path pattern in which the cooling water is not introduced into the heat exchanger can be selected, so unnecessary temperature rise of the cooling water due to heat exchange with the second cooling water in the heat exchanger can be avoided. As a result, the cooling water can be kept at a lower temperature.

In a technical solution of the present invention, a second cooling water circuit and a heat exchanger may be further included. The second cooling water circuit may be arranged separately from the above-mentioned first cooling water circuit, and the above-mentioned internal combustion engine is cooled by using a circulation water of the second cooling water circuit. The heat exchanger may be configured to exchange heat between the second cooling water circulated in the second cooling water circuit and the cooling water circulated in the above-mentioned first cooling water circuit. The second cooling water circuit may be provided with a water amount adjustor. The water amount adjustor adjusts an amount of the circulating water of the second cooling water circuit.

By adopting the above-mentioned technical solution, even if in the case where it is difficult to decrease the temperature of the low-temperature cooling water to a desired temperature due to the excessive heat applied from the second cooling water to the cooling water, the temperature rise of the cooling water due to heat exchange with the second cooling water in the heat exchanger can be inhibited by inhibiting the circulating water amount of the second cooling water. As a result, the cooling water is kept at a lower temperature.

In a technical solution of the present invention, an adsorptive reduction NOx catalyst provided in the exhaust passage of the internal combustion engine may be provided. The ECU may be configured to: (c) execute a rich spike control in which an air-fuel ratio of gas flowing into the NOx catalyst during operation is temporarily enriched, and (d) control the EGR device to the EGR rate lower than the EGR rate based on the above-mentioned EGR rate mapping when the rich spike control is executed and the EGR gas is supplied to the intake passage by using the EGR device.

By adopting the above-mentioned technical solution, even if the dew point of the cooler inflow gas is temporarily raised along with the rich spike control during the control of the temperature of the cooling water, condensed water may also be prevented from being formed in the intercooler.

In a technical solution of the present invention, an exhaust gas heat exchanger and an exhaust gas purification catalyst may be further included. The exhaust gas heat exchanger may be configured to exchange heat between the exhaust gas flowing in the exhaust passage and the cooling water circulated in the cooling water circuit. The exhaust gas purification catalyst may be provided in the exhaust passage closer to the downstream side as compared with the exhaust gas heat exchanger. The cooling water circuit may include a third cooling water bypass and a third flow path switcher. The third cooling water bypass may be configured to bypass the exhaust gas heat exchanger. The third flow path switcher may be configured to switch the flow path pattern of the cooling water between a flow path pattern in which the cooling water is introduced into the exhaust gas heat exchanger and a flow path pattern in which the cooling water flows through the third cooling water bypass rather than the exhaust gas heat exchanger. The ECU may be configured to control the third flow path switcher so that the cooling water is prohibited to be introduced into the exhaust gas heat exchanger in the case where the temperature of the exhaust gas purification catalyst is lower than a specified value.

By adopting the above-mentioned technical solution, in the case where the temperature of the exhaust gas purification catalyst is relatively low, the preheating of the exhaust gas purification catalyst is given a higher priority than the temperature rise of the cooling water due to exhaust gas heat. Thus, excellent catalyst preheating property can be ensured, and the cooling water can be heated by using the exhaust gas heat so as to prevent the formation of the condensed water.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
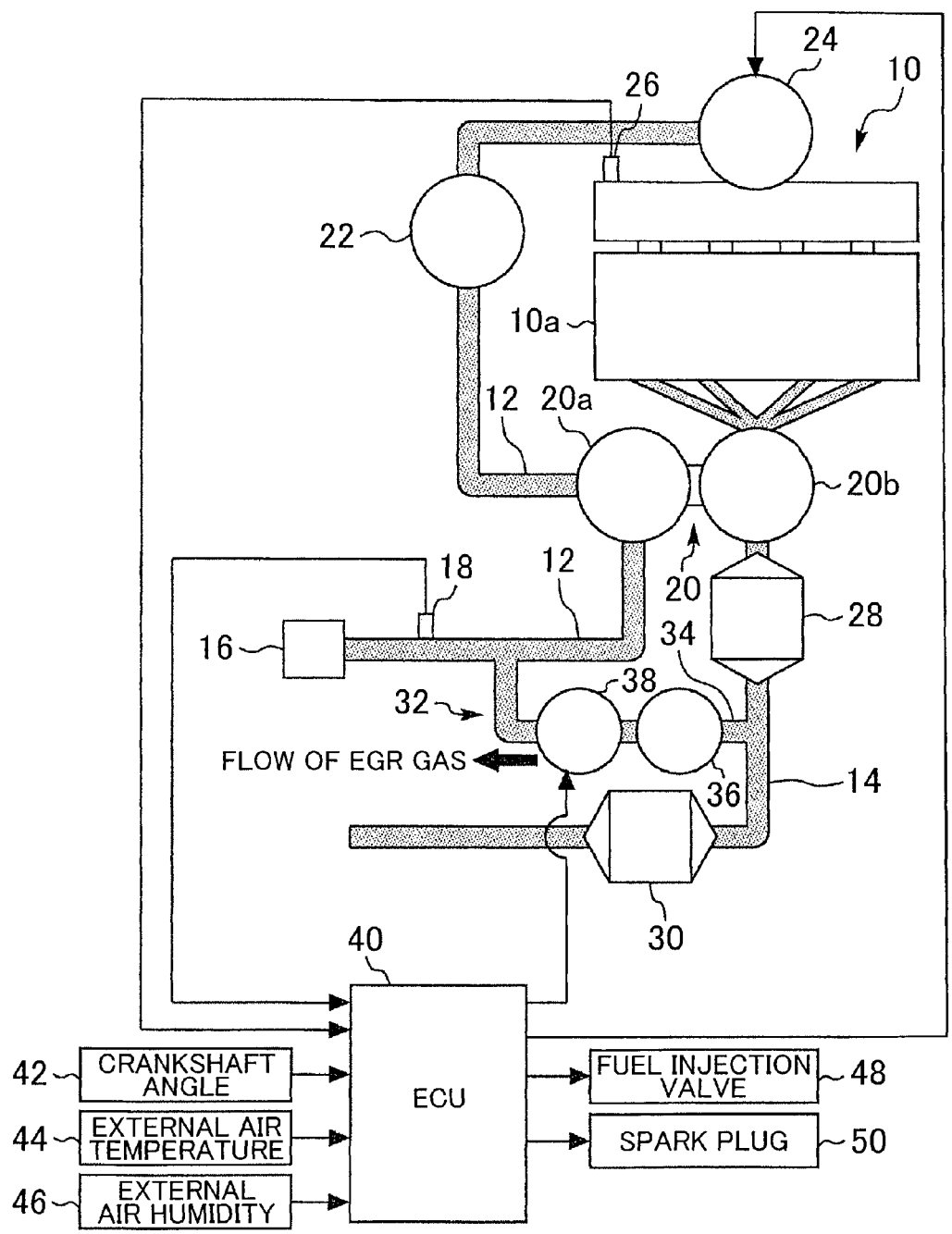
FIG. 1 is a diagram for illustrating a system structure of an internal combustion engine in an embodiment 1 of the present invention.

FIG. 1 is a diagram showing the structure of a control system of an internal combustion engine 10 in embodiment 1 of the present invention. The control system of this embodiment is provided with the internal combustion engine (a gasoline engine is taken as an example) 10. An intake passage 12 and an exhaust passage 14 are in communicated with respective cylinders of the internal combustion engine 10.

An air filter 16 is mounted nearby the inlet of the intake passage 12. An air flow meter 18 is arranged nearby the downstream of the air filter 16, and the air flow meter 18 outputs a signal corresponding to the flow rate of air sucked into the intake passage 12. A compressor 20a of a turbocharger 20 is arranged at the downstream of the air flow meter 18. The compressor 20a is connected integrally with a turbine 20b arranged in the exhaust passage 14 by virtue of a connecting shaft.

A water-cooled intercooler 22 for cooling the air compressed by the compressor 20a is arranged downstream of the compressor 20a. The structure of a cooling system of the internal combustion engine 10 comprising a specific structure for supplying cooling water to the intercooler 22 will be described in detail below with reference to FIG. 2. In addition, an electronic-controlled throttle valve 24 is arranged downstream of the intercooler 22. In addition, an intake pressure sensor 26 for detecting intake pressure (supercharge pressure) is arranged in the intake passage 12 on the downstream side of the throttle valve 24.

Various catalysts for purifying exhaust gas are arranged in the exhaust passage 14 closer to the downstream side as compared with the turbine 20b. Herein, as an example, an S/C (starting catalyst) 28 and an NSR (adsorptive reduction NOx catalyst) 30 and the like, which serve as a three-way catalyst, are sequentially arranged from the upstream side of exhaust gas. By providing the NSR 30, emission of NOx can be effectively inhibited during lean combustion operation with an air-fuel ratio leaner than a theoretical air-fuel ratio.

Moreover, the internal combustion engine 10 shown in FIG. 1 is provided with a low pressure loop (LPL) type exhaust recirculation device (EGR device) 32. The EGR device 32 is provided with an EGR passage 34, and the EGR passage 34 connects the exhaust passage 14 closer to the downstream side as compared with the turbine 20b (in particular, a portion of the exhaust passage 14 between the S/C 28 and the NSR 30 in more detail) with the intake passage 12 closer to the upstream side as compared with the compressor 20a. From the upstream side of gas flow of EGR gas introduced into the intake passage 12, an EGR cooler 36 and an EGR valve 38 are sequentially arranged in the midway of the EGR passage 34. The EGR cooler 36 is a water-cooled cooler for cooling the EGR gas flowing in the EGR passage 34. The EGR valve 38 is configured to adjust the amount of the EGR gas which flows back to the intake passage 12 through the EGR passage 34. By adopting the EGR device 32 with the above structure, the EGR gas can be introduced even at the time of supercharging.

Moreover, the system shown in FIG. 1 is provided with an ECU (Electronic Control Unit) 40. In addition to the above-mentioned air flow meter 18, various sensors for detecting the operating state of the internal combustion engine 10, such as a crankshaft angle sensor 42 for detecting the rotation speed of the engine and the like, are connected to the input portion of the ECU 40. In addition, an external air temperature sensor 44 for detecting the temperature of external air and an external air humidity sensor 46 for detecting the humidity of external air are connected to the input portion of the ECU 40 respectively. On the other hand, in addition to the above-mentioned throttle valve 24 and the EGR valve 38, various actuators for controlling the operation of the internal combustion engine 10, such as a fuel injection valve 48 for injecting fuel to cylinders or air intake of the internal combustion engine 10 and spark plugs 50 for igniting mixed gas in the cylinders and the like, are connected to the output portion of the ECU 40. The ECU 40 controls the operation of various actuators according to the output of above-mentioned various sensors and specified routines, so as to control the operation of the internal combustion engine 10.

Figure 2:
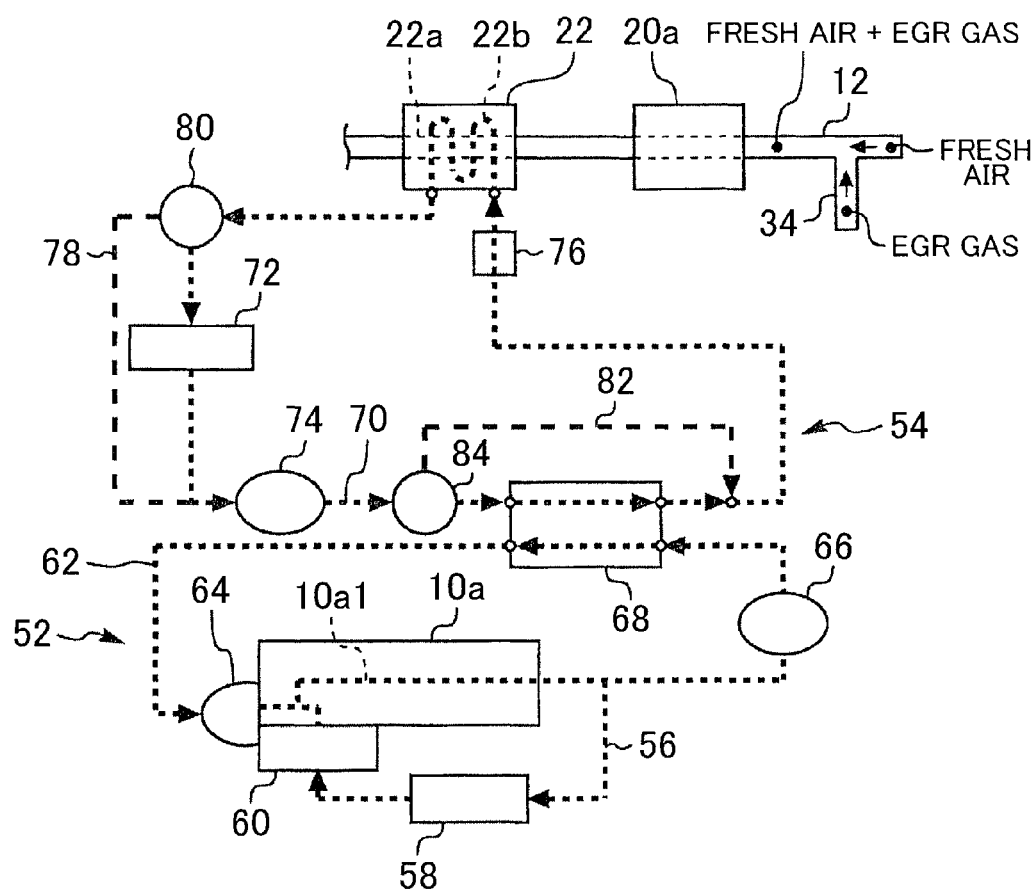
FIG. 2 is a diagram showing a structure of a cooling system of the internal combustion engine shown in FIG. 1.

FIG. 2 is a diagram showing a structure of the cooling system of the internal combustion engine 10 shown in FIG. 1. As shown in FIG. 2, the cooling system of the internal combustion engine 10 is provided with an engine cooling circuit 52 and an intercooler cooling circuit 54 which are used as a water-cooled double-system cooling circuit formed by the circulation of cooling water. The engine cooling circuit 52 is a circuit mainly used for cooling a main body ("engine main body" for short below) 10a of the internal combustion engine 10. The intercooler cooling circuit 54 is formed separately from the engine cooling circuit 52 and is a circuit for cooling the gas flowing through the intercooler 22.

The engine cooling circuit 52 is used to cool the engine main body 10a with a heat load higher than that of the intercooler 22. Thus, the temperature of the cooling water circulated in the engine cooling circuit 52 is substantially higher than that of the cooling water circulated in the intercooler cooling circuit 54. In other words, the intercooler cooling circuit 54 with the above-mentioned structure can be referred to as a circulation circuit through which the cooling water with a temperature lower than that of the cooling water circulated in the engine cooling circuit 52 may be circulated. Thus, in the description below, in order to distinguish the cooling water flowing in the two circuits 52 and 54, the cooling water flowing in the engine cooling circuit 52 is referred to as "high-temperature cooling water", and the cooling water flowing in the intercooler cooling circuit 54 and having a relatively low temperature is referred to as "low-temperature cooling water".

The engine cooling circuit 52 is provided with a first high-temperature cooling water circulating passage 56 through which the outlet of a main body cooling water passage 10a1 formed in the engine main body 10a is connected to the inlet of the main body cooling water passage 10a1. That is, the first high-temperature cooling water circulating passage 56 is a passage for circulating the high-temperature cooling water between the first high-temperature cooling water circulating passage 56 and the main body cooling water passage 10a1. A high-temperature side radiator 58 for cooling the high-temperature cooling water is arranged at the midway of the first high-temperature cooling water circulating passage 56. A thermostat 60 is arranged at an end of the first high-temperature cooling water circulating passage 56 closer to the downstream side as compared with the high-temperature side radiator 58. The thermostat 60 is configured to open when the high-temperature cooling water reaches a specified temperature. In addition, the main body cooling water passage 10a1 is arranged throughout the engine main body 10a, so as to cool individual portions in the engine main body 10a (a cylinder cover, a cylinder body and the like).

The engine cooling circuit 52 is provided with a second high-temperature cooling water circulating passage 62 serving as a passage bypassing the high-temperature side radiator 58. The second high-temperature cooling water circulating passage 62 is configured to branch from the first high-temperature cooling water circulating passage 56 at a position closer to the upstream side as compared with the high-temperature side radiator 58, and is configured to join the inlet side of the main body cooling water passage 10a1 at a position close to a location where the thermostat 60 is arranged. A high-temperature side water pump 64 for circulating the high-temperature cooling water in the engine cooling circuit 52 is arranged at the end of the inlet side of the main body cooling water passage 10*a*1 in the second high-temperature cooling water circulating passage 62. As an example, the high-temperature side water pump 64 is driven by using a torque output from a crankshaft (omitted in the figure).

In addition, in the midway of the second high-temperature cooling water circulating passage 62, a high-temperature side electric water pump 66 and a heat exchanger 68 are sequentially arranged from the upstream side. The heat exchanger 68 is configured to exchange heat between the high-temperature cooling water flowing in the second high-temperature cooling water circulating passage 62 and the low-temperature cooling water flowing in a low-temperature cooling water circulating passage 70 described later. The high-temperature side electric water pump 66 is provided for controlling the flow rate of the high-temperature cooling water supplied to the heat exchanger 68, and is electrically connected to the ECU 40. In addition, as long as the flow rate of the high-temperature cooling water can be controlled, the high-temperature side electric water pump 66 may also be substituted by a flow adjusting valve, for example.

Under the condition that the thermostat 60 is closed as the temperature of the high-temperature cooling water in the engine cooling circuit 52 is lower than the above-mentioned specified temperature (namely, in a cold state), the high-temperature cooling water does not flow through the high-temperature side radiator 58, but is circulated in the engine cooling circuit 52 through the second high-temperature cooling water circulating passage 62. On the other hand, under the condition that the thermostat 60 is opened as the temperature of the high-temperature cooling water reaches the above-mentioned specified temperature (namely, after preheating of the internal combustion engine 10 is completed), the high-temperature cooling water is also circulated in the first high-temperature cooling water circulating passage 56 passing through the high-temperature side radiator 58. As a result, the high-temperature cooling water is cooled by the high-temperature side radiator 58.

On the other hand, as shown in FIG. 2, an internal intake passage 22*a*, through which intake air (mixed gas of the fresh air and EGR gas at the time of EGR introduction) flows, is formed in the intercooler 22. The internal intake passage 22*a* functions as a portion of the intake passage 12. In addition, an internal cooling water passage 22*b*, through which the low-temperature cooling water flows, is provided within the intercooler 22. The intercooler cooling circuit 54 is provided with a low-temperature cooling water circulating passage 70 for connecting the outlet and the inlet of the internal cooling water passage 22*b*. That is, the low-temperature cooling water circulating passage 70 is a passage for circulating the low-temperature cooling water between the low-temperature cooling water circulating passage 70 and the internal cooling water passage 22*b*.

In the midway of the low-temperature cooling water circulating passage 70, a low-temperature side radiator 72, a low-temperature side electric water pump 74, the above-mentioned heat exchanger 68 and a temperature sensor 76 are sequentially arranged from the upstream side. The low-temperature side radiator 72 is provided for cooling the low-temperature cooling water. The low-temperature side electric water pump 74 is provided for circulating the low-temperature cooling water in the intercooler cooling circuit 54. The temperature sensor 76 is provided for detecting the temperature of the low-temperature cooling water at the inlet of the internal cooling water passage 22*b*.

In addition, the intercooler cooling circuit 54 is provided with a first low-temperature cooling water bypass 78 serving as a passage bypassing the low-temperature side radiator 72. A first three-way electric valve 80 is arranged at the end of the first low-temperature cooling water bypass 78 on the upstream side (or the downstream side) of the low-temperature side radiator 72. The first three-way valve 80 is configured to switch the flow path pattern between a flow path pattern in which the low-temperature cooling water flows through the low-temperature side radiator 72 and a flow path pattern in which the low-temperature cooling water flows through the first low-temperature cooling water bypass 78 and thus does not flow through the low-temperature side radiator 72.

Moreover, the intercooler cooling circuit 54 is provided with a second low-temperature cooling water bypass 82 serving as a passage bypassing the heat exchanger 68. A second three-way electric valve 84 is arranged at the end of the second low-temperature cooling water bypass 82 on the upstream side (or the downstream side) of the heat exchanger 68. The second three-way valve 84 is configured to switch the flow path pattern between a flow path pattern in which the low-temperature cooling water flows through the heat exchanger 68 and a flow path pattern in which the low-temperature cooling water flows through the second low-temperature cooling water bypass 82 and thus does not flow through the heat exchanger 68. In addition, the above-mentioned low-temperature side electric water pump 74, the temperature sensor 76, the first three-way valve 80 and the second three-way valve 84 are electrically connected to the ECU 40.

By adopting the intercooler cooling circuit 54 with the structure mentioned above, by supplying the low-temperature cooling water to the intercooler 22, the intake air, the temperature of which is increased due to being supercharged, can be cooled by using the compressor 20*a*.

When the temperature ("IC water temperature" for short below) of the low-temperature cooling water supplied to the intercooler 22 (the low-temperature cooling water at the inlet of the intercooler 22) is lower than the dew point of gas flowing into the intercooler 22 ("cooler inflow gas" for short below), the moisture in the gas is condensed when the gas is cooled in the intercooler 22, and sometimes condensed water is produced. When the condensed water is produced within the intercooler 22, it is afraid that corrosion of the intercooler 22 will occur. In the internal combustion engine 10 with the above-mentioned structure, the mixed gas of the fresh air and the EGR gas is introduced into the intercooler 22 when the EGR gas is introduced. The EGR gas contains moisture generated by combustion, so condensed water is easily formed when the EGR gas is introduced.

In more detail, the dew point of the above-mentioned mixed gas flowing into the intercooler 22 varies with external air temperature, external air humidity, supercharge pressure (engine load), engine speed, EGR rate and air-fuel ratio. For this purpose, to prevent the condensed water from forming in the intercooler 22 so as to prevent corrosion, it is considered to obtain the dew point of the above-mentioned mixed gas on basis of the above-mentioned parameters and to control the IC water temperature not to be lower than the obtained dew point. When adopting such a method, the dew point varies with the operating state (engine load and engine speed), and accordingly the IC water temperature is changed according to the operating state. As a result, in the case where the operating state changes frequently, the IC water temperature also changes frequently.

Herein, a target EGR rate of the EGR rate, as one of the parameters affecting the dew point of the cooler inflow gas, is set to be determined according to the relationship with the operating state, generally as an EGR rate mapping shown in FIG. 4 below. In more detail, an EGR region for introducing the EGR gas is specified according to the relationship between the engine load and the engine speed, and the EGR rate among respective mapping values in the EGR region is set to be optimal by taking fuel efficiency and exhaust gas emission performance into consideration. In addition, a target air-fuel ratio (basic air-fuel ratio) of the air-fuel ratio as another parameter affecting the dew point is generally set according to the operating state. Thus, when transition is made from one operating state to another operating state, the EGR rate and the air-fuel ratio also change with the engine load (supercharge pressure) and the engine speed change towards the engine load (supercharge pressure) and the engine speed in the transited operating state.

In the case where the above-mentioned method in which the IC water temperature is changed not to be below the dew point of the cooler inflow gas is adopted, it is afraid that the following problems arise when the response time of the IC water temperature is relatively long as compared with a relatively short time during which the supercharge pressure, EGR rate and air-fuel ratio vary with the operating state. That is, due to such a response delay of the IC water temperature, the time for bringing out the power performance, fuel efficiency and exhaust emission performance desired in the transited operating state is substantially limited. In more detail, in the case where it is requested to transit from an operating state in which the IC water temperature is set to relatively high so as to prevent formation of the condensed water to an operating state in which a high output is requested, the high output can not be perfectly ensured during the response delay in which the IC water temperature decreases to a value required for bringing out the high power performance as required in the transited operating stated. In addition, when the response delay of the IC water temperature still exists during the process of increasing the IC water temperature along with the transition of the operating state, the condensed water might be formed when it is required to increase the EGR rate to a value corresponding to the transited operating state. When the change of the EGR rate is delayed to the end of response delay of the IC water temperature so as to avoid the formation of the condensed water, during which the EGR rate can not be controlled to an appropriate value, and therefore, the fuel efficiency and the exhaust emission performance can no longer be brought out sufficiently. When the method in which the IC water temperature is changed along with the operating state into a value higher than the dew point of the intercooler inflow gas is adopted as mentioned above, the chances for bringing out the potential of power performance, fuel efficiency and the like would be substantially limited due to the response delay of the IC water temperature.

Figure 4:
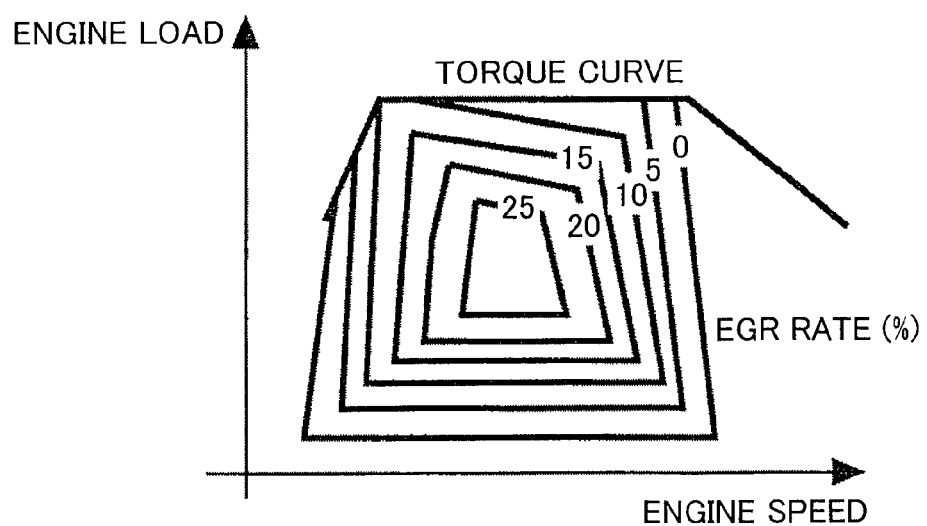
FIG. 4 is a diagram showing an EGR rate mapping referred to for comparing with an EGR rate mapping shown in FIG. 5.

In addition, generally, in the internal combustion engine, there is an EGR rate mapping as shown in FIG. 4 described later, in which the EGR rate is preset according to the relationship with the operating state (load and engine speed), the target value of the EGR rate to be controlled during operation is obtained according to the EGR rate mapping. The mapping value of the EGR rate mapping is determined in accordance with fuel efficiency, exhaust emission performance and the like of the internal combustion engine. Here, in order not to form the condensed water during operation, the control method, in which the EGR rate is appropriately corrected on the basis of the value of the EGR rate mapping by taking the external air state into consideration and various performances such as fuel efficiency are ensured, is taken into consideration. However, when the EGR rate during operation is changed according to a value obtained from the EGR rate mapping by using such a method, many operating parameters such as ignition timing and valve timing of the intake and exhaust valves shall be appropriately adjusted when it is required to operate with high fuel efficiency and exhaust emission performance. That is, a lot of information shall be input to the control device in advance so as to optimize other operating parameters along with the change of the EGR rate. This will complicate the control of engine. In addition, numerous adaptive man-hours are required when it is desired to determine the relationship between the EGR rate and various operating parameters as a mapping so as to perform such adjustment.

Thus, in this embodiment, the following control method is adopted so as to prevent the formation of condensed water in the intercooler 22 in the introduction area of the EGR gas and to ensure to a maximum extent that the specified power performance is brought out and that fuel efficiency and exhaust emission due to the introduction of the EGR gas are improved.

Figure 3:
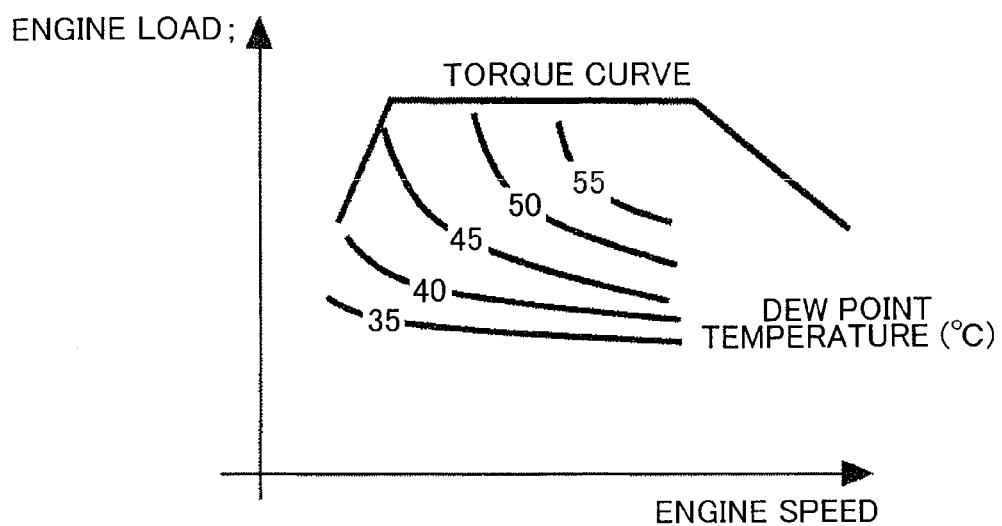
FIG. 3 is a diagram showing the relationship between an operating state and a dew point in a specified external air state.
Figure 5:
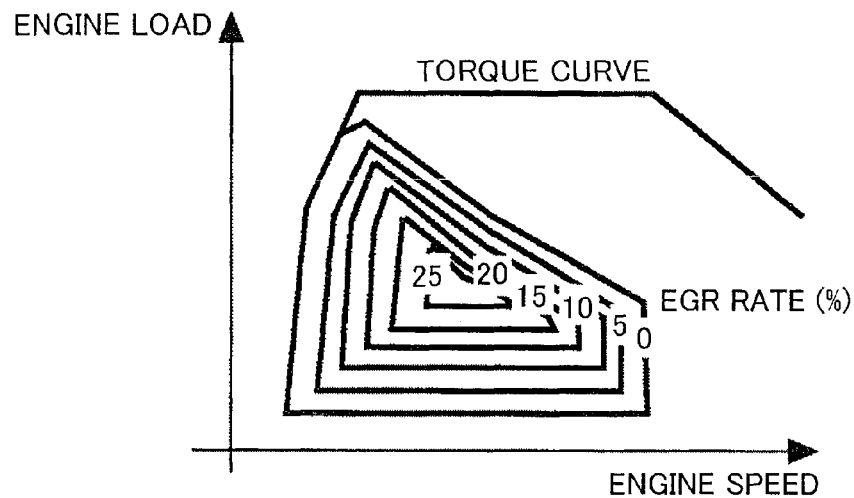
FIG. 5 is a diagram showing a set EGR rate mapping with features used in embodiment 1 of the present invention.

FIG. 3 is a diagram showing the relationship between the operating state and the dew point in a specified external air state. FIG. 4 is a diagram showing an EGR rate mapping, for comparing with an EGR rate mapping shown in FIG. 5. FIG. 5 is a diagram showing a characterized EGR rate mapping used in the embodiment 1 of the present invention.

In the control of this embodiment, the IC water temperature, which is required for ensuring a specified power performance value (for example, torque) in a specified external air state in which the external air temperature and the external air humidity are a specified temperature and a specified humidity respectively, is set in advance to a target temperature (herein, as an example, the target temperature has a value obtained by adding a specified margin α to 40° C.) of the IC water temperature. Moreover, in the operation of the internal combustion engine 10, when the external air state is in the specified external air state, the IC water temperature is controlled so as to obtain the target temperature.

The specified external air state herein is a high-temperature state or humid state or high-temperature humid state, in which it is easy to form the condensed water in the intercooler 22. In more detail, the specified external air state can be set as a state with a temperature and a humidity located at the center of temperature and humidity sub-region (high temperature and humid sub-region in which the condensed water may be easily formed) within a temperature and humidity region of the area in which the vehicle equipped with the internal combustion engine 10 is used. Moreover, the specified external air state can be set as a state covering the temperature and humid region of the external air in which the vehicle is used, so that the specified external air state is for example a state in which the external air temperature is 25° C. and the external air humidity is 100%.

The dew point of the cooler inflow gas in the above-mentioned specified external air state is expressed by using the relationship between the engine load and the engine speed, as shown in FIG. 3. That is, the higher the engine load and the engine speed (particularly the engine load) are, the higher the dew point is. In the EGR rate mapping shown in FIG. 4, the EGR rate serving as each mapping value in the EGR region is set by taking the fuel efficiency and the exhaust emission performance into consideration. However, this mapping is different from the EGR rate mapping of the embodiment as shown in FIG. 5 described later, and the mapping values in FIG. 4 are set without taking the dew point of the cooler inflow gas into consideration, that is to say the mapping values in FIG. 4 are set without considering the inhibition of the formation of the condensed water. In addition, the distribution of the dew points in FIG. 3 assumes a condition in which the EGR gas is introduced according to the EGR rate mapping shown in FIG. 4 (namely, the EGR gas is maximally (optimally) introduced without considering the inhibition the formation of condensed water). In addition, as mentioned above, the basic air-fuel ratio is generally set according to the relationship between the engine load and the engine speed. As mentioned above, the dew point temperature mapping shown in FIG. 3 may also involve the influence of the EGR rate and the air-fuel ratio on the dew point, and the dew point of the cooler inflow gas is determined according to the relationship with the operating state.

In a state in which the IC water temperature is controlled to a predetermined target temperature (40° C.+α herein) of the IC water temperature which may ensure the specified power performance value in the specified external air state as mentioned above, the condensed water will be formed according to EGR rate determined based on the EGR rate mapping as shown in FIG. 4 when an operating region on a high load and high revolution speed side with a higher dew point than a value (40° C.) obtained by subtracting margin α from the target temperature is used (refer to FIG. 3).

For this purpose, as the EGR rate mapping used in this embodiment, the EGR rate mapping, in which respective mapping values are set so that the dew point of the cooler inflow gas when introducing the EGR gas does not exceed the above target temperature of the IC water temperature, is stored in a storage portion of the ECU 40. In this EGR rate mapping, as shown in FIG. 5, a value (40° C.) obtained by subtracting the margin α from the above target temperature is used as the highest dew point in the EGR region. In this way, in the EGR rate mapping used in this embodiment, respective mapping values are set by taking the dew point (40° C. with respect to 40° C.+α in the condition of this embodiment) corresponding to the target temperature of the IC water temperature. In this way, the EGR rate mapping sets the EGR rate according to the relationship between the parameters, namely engine load (as an index value indicating the engine load, e.g. intake amount or intake load rate (=filling efficiency)) and engine speed, of the operating state of the specified internal combustion engine 10.

In more detail, in an operating region on the high load and high revolution speed side in which the dew point of the cooler inflow gas is higher than the target temperature (in more detail, a specific temperature (40° C. herein) obtained by subtracting the specified margin α from the target temperature) of the IC water temperature, the EGR rate mapping as shown in FIG. 5 sets the EGR rate with which the dew point of the cooler inflow gas in the specified external air state are all limited to the above target temperature (precisely, the specific temperature). By setting in this way, respective mapping values in the EGR region on the high load and high revolution speed side in which the dew point is higher than the target temperature (precisely, the specific temperature) can be set with a range in which the dew point of the cooler inflow gas does not exceed the target temperature of the IC water temperature. Further, in other words, the EGR rate mapping shown in FIG. 5 is a mapping for determining the EGR rate with which imported maximum introduction can be achieved in the case where the dew point of the cooler inflow gas is limited to a value determined based on the target temperature of the IC water temperature. By adopting the EGR rate mapping set as shown in FIG. 5, the dew point of the cooler inflow gas in the EGR area is adjusted by using the dew point (specific temperature) corresponding to the target temperature of the IC water temperature as the highest dew point. By adopting the EGR rate mapping shown in FIG. 5 set as mentioned above, dewing can be prevented in a region on the high load and high revolution speed side in which dewing occurs when the IC target temperature is controlled to be constant in accordance with the EGR rate mapping shown in FIG. 4 in which the mapping is set without considering the dew point.

In this embodiment, as an EGR rate mapping used for obtaining the EGR rate, the ECU 40 only has one EGR rate mapping preset on the basis of the above-mentioned idea, and an EGR rate corresponding to the current operating state is obtained by using the EGR rate mapping regardless whether the external air state is the above-mentioned specified external air state. Moreover, in the specified external air state, the IC water temperature is controlled to be constant, so as to be the target temperature preset on the basis of the above-mentioned idea.

Figure 6:
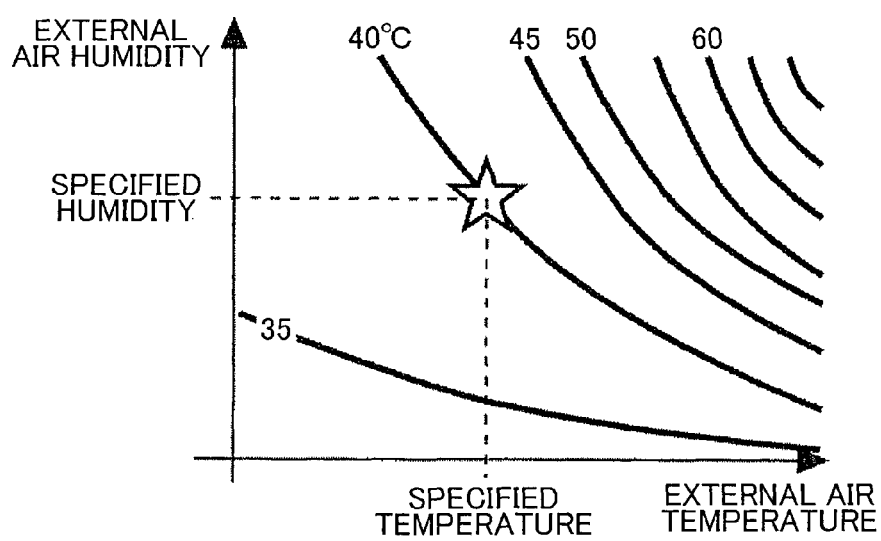
FIG. 6 is a diagram showing the relationship between an external air temperature and an external air humidity and a dew point of cooler inflow gas.

FIG. 6 is a diagram showing the relationship between the external air temperature and external air humidity and the dew point of cooler inflow gas. In addition, the relationship shown in FIG. 6 is obtained under the same operating condition (the condition in which the engine load (supercharge pressure), engine speed, air-fuel ratio and EGR rate are the same) as the operating condition in which the target temperature of the IC water temperature is set in the above-mentioned specified external air state. That is, the dew point when the external air temperature is 25° C. and the external air humidity is 100% is obtained as 40° C. by means of the relationship shown in FIG. 6, in the case where the external air state in which the external air temperature is 25° C. and the external air humidity is 100% is set as the specified external air state and the target temperature of the IC water temperature in the specified external air state is set as a value obtained by adding 40° C. to a margin α, for example.

When the EGR rate mapping shown in FIG. 5 is used in an external air state different from the specified external air state during the operation of the internal combustion engine 10, the dew point (highest dew point) of the cooler inflow gas in the operating region on the high load and high revolution speed side is different from the dew point in the specified external air state. As a result, even if the external air state in which the dew point is higher than the value of the dew point in the specified external air state occurs, if the IC water temperature is entirely controlled according to the target temperature set in the above-mentioned, manner, condensed water would also be formed in the case where the dew point exceeds the target temperature.

For this purpose, in this embodiment, in the case where the external air state is different from the specified external air state, the target temperature of the IC water temperature is corrected based on a dew point of the cooler inflow gas obtained with respect to the current external air temperature and the current external air humidity by using the relationship shown in FIG. 6. In more detail, the target temperature is increased (the target temperature is changed to a value obtained by adding the dew point in the current external air state to the margin α) so as to not exceed the dew point in the current external air state in the case where one or both of the external air temperature and the external air humidity is/are higher than that in the specified external air state so that the dew point is higher than that in the specified external air state, for example.

By adopting the control method of the above-mentioned embodiment, the IC water, temperature is controlled by taking the IC water temperature with which the specified power performance value is ensured in the specified external air state as the target temperature, and the IC water temperature does not vary with the operating state. In addition, as the EGR rate mapping, a mapping in which an EGR rate is set as a mapping value so that the dew point of the cooler inflow gas does not exceed the target temperature when the EGR gas is introduced. Thus, when operating in the specified external air state, the EGR gas can be introduced as the preset EGR rate mapping (namely, maximumly within a possible range) without dewing in the intercooler 22 while ensuring the above-mentioned specified power performance value. Therefore, the formation of the condensed water in the intercooler 22 can be inhibited, and the potential of various performances (power performance, fuel efficiency, exhaust gas emission performance and the like) of the internal combustion engine 10 can be brought out regardless of the response delay of water temperature control. In addition, by using the high-temperature state or humid state or high-temperature and humid external air state as the specified external air state for determining the target temperature of the IC water temperature, even in the external air state in which the condensed water is easily formed in the intercooler 22, the specified power performance value may be ensured, and the introduction of the EGR gas just as the preset EGR rate mapping may also be ensured.

In addition, by adopting the control method of this embodiment, even if the external air state is different from the specified external air state, formation of the condensed water in the intercooler 22 can be prevented by changing the target temperature of the IC water temperature according to the dew point (highest dew point) of the cooler inflow gas changing along with the change of the external air state without the necessity of changing the EGR rate mapping according to the external air state. Thus, compared with a control method in which the EGR rate is appropriately corrected based on a value of the EGR rate mapping according to the external air state so as not to form the condensed water during operation and various performances such as fuel efficiency are ensured, complication of engine control can be avoided, and adaptive man-hour of various mappings required for implementing that control method can be reduced. Moreover, in this way, the EGR rate is not changed according to the external air state (one EGR rate mapping is applicable), so deterioration of the fuel efficiency due to the change of the EGR rate can be prevented from occurring. In addition, compared with the change of the operating state during operation, the change of the external air state during operation of the internal combustion engine 10 is very slow. Therefore, even if the IC water temperature is changed along with the change of the external air state, the response delay of the water temperature control is not problematic as in the case where the IC water temperature is changed according to the operating state.

Figure 7:
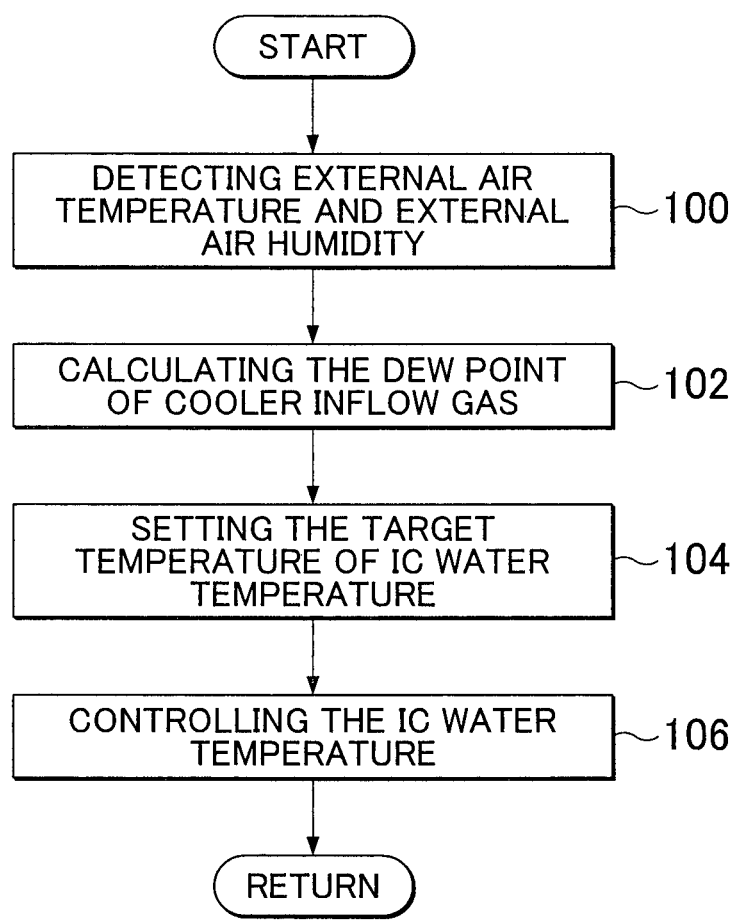
FIG. 7 is a flow chart of a routine executed in embodiment 1 of the present invention.

FIG. 7 is a flow chart showing a routine executed by the ECU 40 for setting the target temperature of the IC water temperature in embodiment 1 of the present invention. In addition, the routine is repeatedly executed every specified control period.

In the routine shown in FIG. 7, the ECU 40 first detects the current external air temperature and the current external air humidity by using the external air temperature sensor 44 and the external air humidity sensor 46 (step 100). In addition, the method for obtaining the temperature and humidity of the external air is not limited to a method in which such temperature and humidity are detected by sensors, the temperature and humidity of the external air may also be estimated by other known method.

Then, the ECU 40 calculates the dew point of the cooler inflow gas with respect to the current external air state (temperature and humidity) (step 102). In step 102, the dew point of the current cooler inflow gas is obtained by referring to a mapping stored in ECU 40, in which mapping a relationship between the dew point of the cooler inflow gas and the external air temperature and external air humidity is preset, as shown in FIG. 6.

Next, the ECU 40 sets a target temperature of the IC water temperature corresponding to the obtained current dew point (step 104). In more detail, a value obtained by adding the obtained dew point and a specified margin α is set as the target temperature of the IC water temperature. Thus, in the case where the external air state is different from the specified external air state, the target temperature of the IC water temperature is corrected. Then, the ECU 40 controls the IC water temperature by the following control method so as to obtain the set target temperature (step 106).

With the cooling system of the internal combustion engine 10 comprising the engine cooling circuit 52 and the intercooler cooling circuit 54, the temperature of the low-temperature cooling water at the outlet of the heat exchanger 68 can be adjusted by changing the discharge flow of the low-temperature side electric water pump 74. Thus, by feed-back control of the discharge flow so that the IC water temperature is consistent with the target temperature, the IC water temperature can be controlled to a desired temperature.

In addition, as mentioned above, the cooling system of this embodiment further includes the first low-temperature cooling water bypass 78, the second low-temperature cooling water bypass 82 and the high-temperature side electric water pump 66; the first low-temperature cooling water bypass 78 can be selectively used by switching the flow passage using the first three-way valve 80; the second low-temperature cooling water bypass 82 can be selectively used by switching the flow passage using the second three-way valve 84; and the high-temperature side electric water pump 66 can adjust the flow rate of the high-temperature cooling water supplied to the heat exchanger 68. According to different operating state of the internal combustion engine 10 and different external air state, sometimes it is difficult for the IC water temperature to reach the target temperature by controlling the discharge flow of the low-temperature side electric water pump 74 only. For this purpose, in this case, the above-mentioned structure may also be used, e.g. the control range of the low-temperature cooling water is enlarged by adopting the following method.

As an example 1, in the case where external air temperature is low while maintaining a low-load traveling, the heat for keeping the IC water temperature higher than the dew point of the cooler inflow gas may not be supplied from the high-temperature cooling water to the low-temperature cooling water. For this purpose, in this case, the first three-way valve 80 is preferably controlled, so that the low-temperature cooling water bypasses the low-temperature side radiator 72 and flows into the first low-temperature cooling water bypass 78 side. Thus, unnecessary heat dissipation of the low-temperature side radiator 72 can be avoided. As a result, the temperature of the low-temperature cooling water circulated in the intercooler cooling circuit 54 is kept at a higher temperature. In addition, in the case of the example 1, as an alternative to the above-mentioned method or together with the above-mentioned method, the flow of the high-temperature cooling water supplied to the heat exchanger 68 by the high-temperature side electric water pump 66 can be increased. With such a method, the temperature of the low-temperature cooling water can also be further increased.

In addition, as an example 2, during high-load operation such as full-load operation, excessive heat from the high-temperature cooling water is applied to the low-temperature cooling water, so it is difficult to decrease the temperature of the low-temperature cooling water to a desired temperature by heat dissipation of the low-temperature side radiator 72 only, and the internal combustion engine 10 may no longer achieve a desired output. In particular, in the case where a water pump driven by the torque of the crankshaft so that the high-temperature side water pump 64 of the internal combustion engine 10 can be like that, the revolution speed (discharge flow) of the water pump is increased in proportion to the engine speed. This becomes a main reason for the increasing of the heat supplied to the heat exchanger 68 in a high rotation speed area. Thus, in this case, the second three-way valve 84 is preferably controlled, so that the low-temperature cooling water bypasses the heat exchanger 68 and flows into the second low-temperature cooling water bypass 82 side. Thus, unnecessary temperature rise of the low-temperature cooling water due to heat exchange with the high-temperature cooling water in the heat exchanger 68 can be avoided. As a result, the temperature of the low-temperature cooling water circulated in the intercooler cooling circuit 54 is kept at a lower temperature. Alternatively, the flow rate of the high-temperature cooling water supplied to the heat exchanger 68 by the high-temperature side electric water pump 66 is also preferably inhibited. With such a method, it is easy for the temperature of the low-temperature cooling water to be decreased.

As mentioned above, with the control of this embodiment, the IC water temperature is controlled to be constant as long as the external air state is not changed. However, the following control may be executed exceptionally in the case where high-output region (operating region at the high load and high revolution speed side, in which the EGR rate is not set, as shown in FIG. 5) in which the EGR gas is not introduced is frequently used, e.g., in the case where another vehicle is towed while climbing a slope. That is, in the case where it is determined that the high output region is frequently used, the introduction of the EGR gas is not performed and the IC water temperature is kept as low as possible even if the EGR region is temporarily used. Thus, knock may be effectively inhibited, and therefore the ignition timing is advanced. In addition, the intake temperature and therefore the exhaust gas temperature decreases with the decrease of the IC water temperature, so that fuel increment for preventing excessive rise of temperatures (OT) of the turbine 20b and the catalysts (S/C 28 and the like) can be inhibited. The fuel consumption can be reduced according to these main reasons. In addition; as a method for determining whether the case is a case in which the high output region is frequently used, for example, a method in which it is determined that whether the use rate of the EGR free region on the high load and high revolution speed side in the past specified time period exceeds a specified value as shown in FIG. 5 may be used.

In addition, in the above-mentioned embodiment 1, the intercooler cooling circuit 54 is equivalent to a "first cooling water circuit" and the storage portion integrated in the ECU 40 is equivalent to an "EGR rate mapping". In addition, the external air temperature sensor 44 is equivalent to an "external air temperature detector", and the external air humidity sensor 46 is equivalent to an "external air humidity detector". In addition, the low-temperature side radiator 72 is equivalent to a "radiator", and the first low-temperature cooling water bypass 78 is equivalent to a "first cooling water bypass". In addition, the ECU 40 realizes a "first flow path switcher" by controlling the first three-way valve 80. In addition, the engine cooling circuit 52 is equivalent to a "second cooling water circuit", the high-temperature cooling water is equivalent to "second cooling water", the heat exchanger 68 is equivalent to a "heat exchanger", and the second low-temperature cooling water bypass 82 is equivalent to a "second cooling water bypass". In addition, the ECU 40 realizes a "second flow path switcher" by controlling the second three-way valve 84, and realizes a "water amount adjustor" by controlling the high-temperature side electric water pump 66.

Next, an embodiment 2 of the present invention will be described with reference to FIG. 8. By using the hardware structures shown in FIG. 1 and FIG. 2, the ECU 40 can further execute the routine shown in FIG. 7 and routine shown in FIG. 8 described later, so as to implement the system of this embodiment.

In a system in which NOx is treated by using the NSR 30 of the internal combustion engine 10, in order to reduce NOx absorbed in the NSR 30, a control in which the air-fuel ratio is changed to be more rich (so-called rich spike control) within a short time period is executed. Rich spike control sometimes is executed during the introduction of EGR gas when the EGR gas is introduced during lean combustion operation.

Herein, in the case where EGR rate is identical, compared with the lean air-fuel ratio, the dew point of the cooler inflow gas is higher at the rich air-fuel ratio. The reason is that hydrogen in the fuel and oxygen in the air are combined into water during combustion, so compared with the lean air-fuel ratio, the water content of the exhaust gas is higher at the high air-fuel ratio with a relatively high hydrogen content. Thus, in the case where the rich spike control is executed when the EGR gas is introduced, a portion of the exhaust gas with a relatively high air-fuel ratio becomes the EGR gas, so the dew point of the cooler inflow gas temporarily increases. When such a phenomenon is not taken into consideration, dew may be formed in the intercooler 22.

Thus, in this embodiment, substantially together with the IC water temperature control used in the embodiment 1 with a single EGR rate mapping, in the case where the rich spike control is executed during the introduction of the EGR gas, correction is exceptionally applied to the EGR rate determined according to the EGR rate mapping. In detail, when, the rich spike control is executed, the EGR rate used in the current operating state is subtracted from a value determined according to the EGR rate mapping, so as to become an EGR rate with which the dew point of the cooler inflow gas does not exceed the highest dew point (the above-mentioned specified temperature) within the EGR region.

Figure 8:
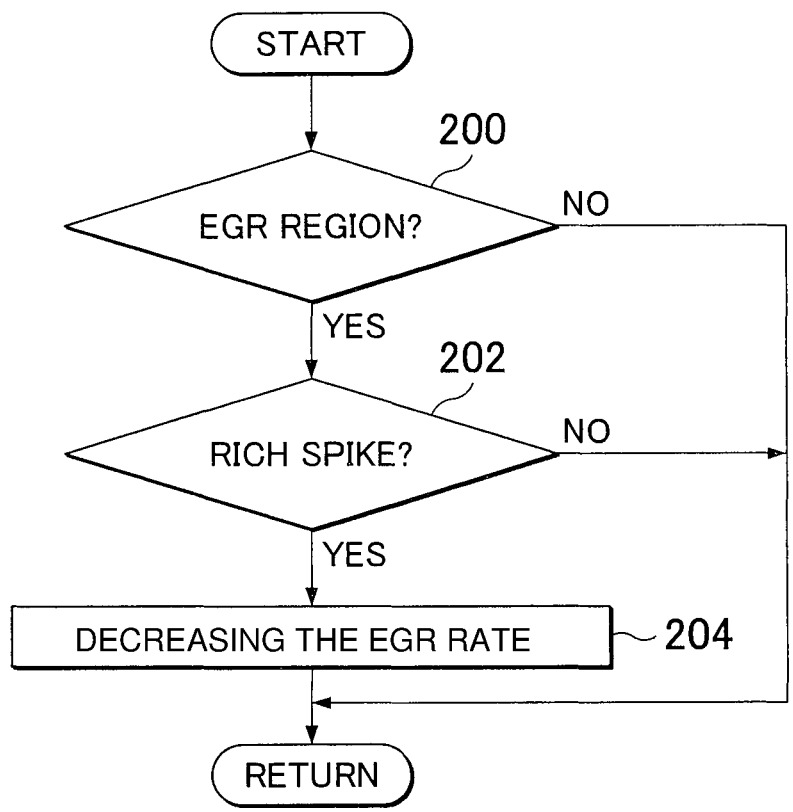
FIG. 8 is a flow chart of a routine executed in embodiment 2 of the present invention.

FIG. 8 is a flow chart showing a routine executed by the ECU 40 for implementing the control of features in embodiment 2 of the present invention. In addition, the routine is repeatedly executed every specified control period.

In the routine shown in FIG. 8, the ECU 40 first determines whether the current operating region is an EGR area where EGR gas is introduced by using the EGR device 32 (step 200). As a result, if the determination in step 200 is established, the ECU 40 then determines whether the specified rich spike execution condition is established (step 202).

In the case where the determination in step 202 is established, namely in the case where it is determined that the rich spike control is executed during the introduction of the EGR gas, correction for decreasing the EGR rate used in the current operating state with respect to the value determined according to the EGR rate mapping is made by ECU 40, so as to become an EGR rate with which the dew point of the cooler inflow gas does not exceed the highest dew point within the EGR region (step 204). The correction may be performed by the following method. That is, a mapping (omitted in the figure) in which the relationship between the change of the EGR rate and the change of the dew point of the cooler inflow gas is preset with respect to the specified high air-fuel ratio when the rich spike is implemented is stored in the ECU 40. Moreover, the correction amount of the EGR rate required for enabling the dew point of the cooler inflow gas not to exceed the highest dew point within the EGR region is calculated with reference to the mapping, and the EGR rate according to the EGR rate mapping is corrected by using the correction amount.

By adopting the above-mentioned routine shown in FIG. 8, even if the dew point of the cooler inflow gas rises temporarily along with the implementation of the rich spike control in the process of executing the above-mentioned IC water temperature control in embodiment 1, formation of condensed water in the intercooler 22 may also be prevented.

Next, an embodiment 3 of the present invention will be described with reference to FIG. 9 to FIG. 11. The routine shown in FIG. 11 described later can be executed instead of the routine shown in FIG. 7 by the ECU 40 by using the hardware structures shown in FIG. 1 and FIG. 2, so that the system of this embodiment is realized. In addition, the routine shown in FIG. 8 in embodiment 2 may be executed together with the routine shown in FIG. 11.

Figure 9:
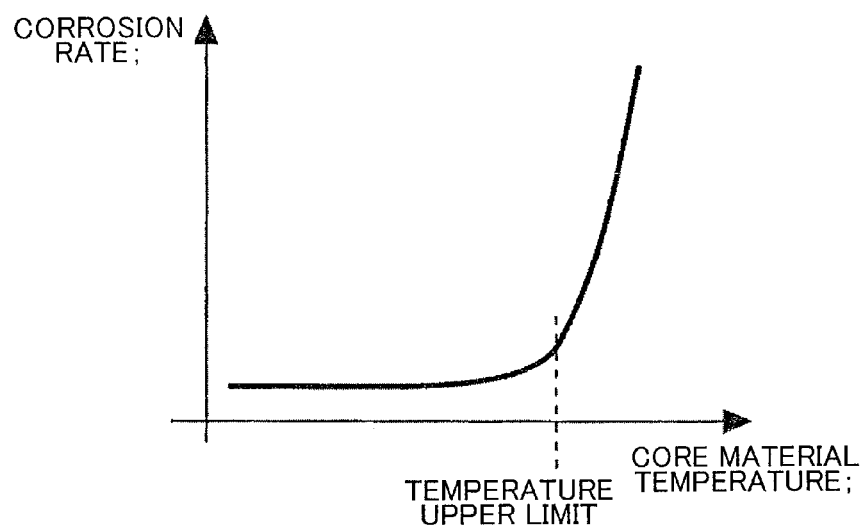
FIG. 9 is a diagram showing the relationship between the corrosion rate of a core material of an intercooler and the temperature thereof.
Figure 10:
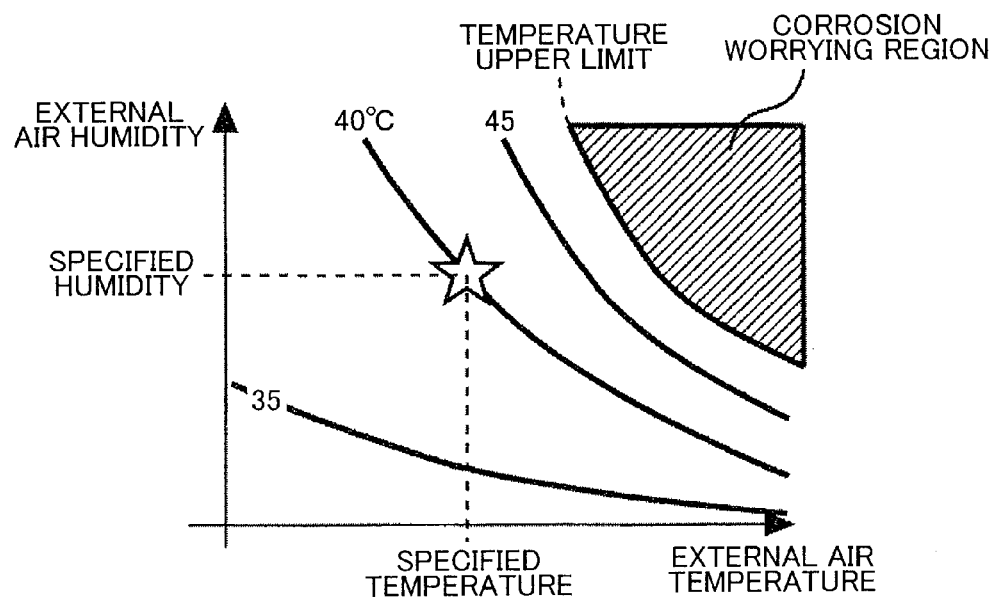
FIG. 10 is a diagram illustrating the relationship between an external air temperature and an external air humidity and a dew point of cooler inflow gas for illustrating a corrosion worrying region of the core material.

FIG. 9 is a diagram showing the relationship between the corrosion rate of a core material of the intercooler 22 and the temperature of the core material. Similar to FIG. 6, FIG. 10 is a diagram showing the relationship between the external air temperature and external air humidity and the dew point of cooler inflow gas for illustrating a corrosion worrying region of the core material. In addition, "specified temperature" and "specified humidity" marked in FIG. 10 indicate temperature and humidity in the above-mentioned specified external air state respectively.

In the IC water temperature control of embodiment 1, in order to prevent formation of the condensed water with the change of the external air state, the target temperature of the IC water temperature is changed according to the external air state (temperature and humidity). Here, in the case where the temperature (substantially equal to the temperature of the low-temperature cooling water in the intercooler) of the core material of the intercooler 22 is relatively high, the corrosion reaction of the core material is easily accelerated. In more detail, as shown in FIG. 9, when the temperature of the core material exceeds a certain temperature level, the degree of change of the corrosion rate is aggravated relative to the temperature change. Thus, the method for enabling the IC water temperature to be a high temperature for preventing dewing for inhibiting the corrosion of the core material may achieve an opposite effect in the case where the temperature of the core material is above the specified temperature (the temperature upper limit shown in FIG. 9, e.g. 50° C.).

Thus, in this embodiment, in the case where the external air temperature and the external-air humidity are in a temperature and humidity region (a corrosion worrying region shown by shadow in FIG. 10) of external air where the dew point of the cooler inflow gas is above the above-mentioned temperature upper limit (a temperature of the core material with which the corrosion occurs with the increase of the IC water temperature), in order that the dew point of the cooler inflow gas is above the dew point in the corrosion worrying region, the target temperature of the IC water temperature is not changed, whereas the dew point of the cooler inflow gas is decreased by decreasing the EGR rate.

Figure 11:
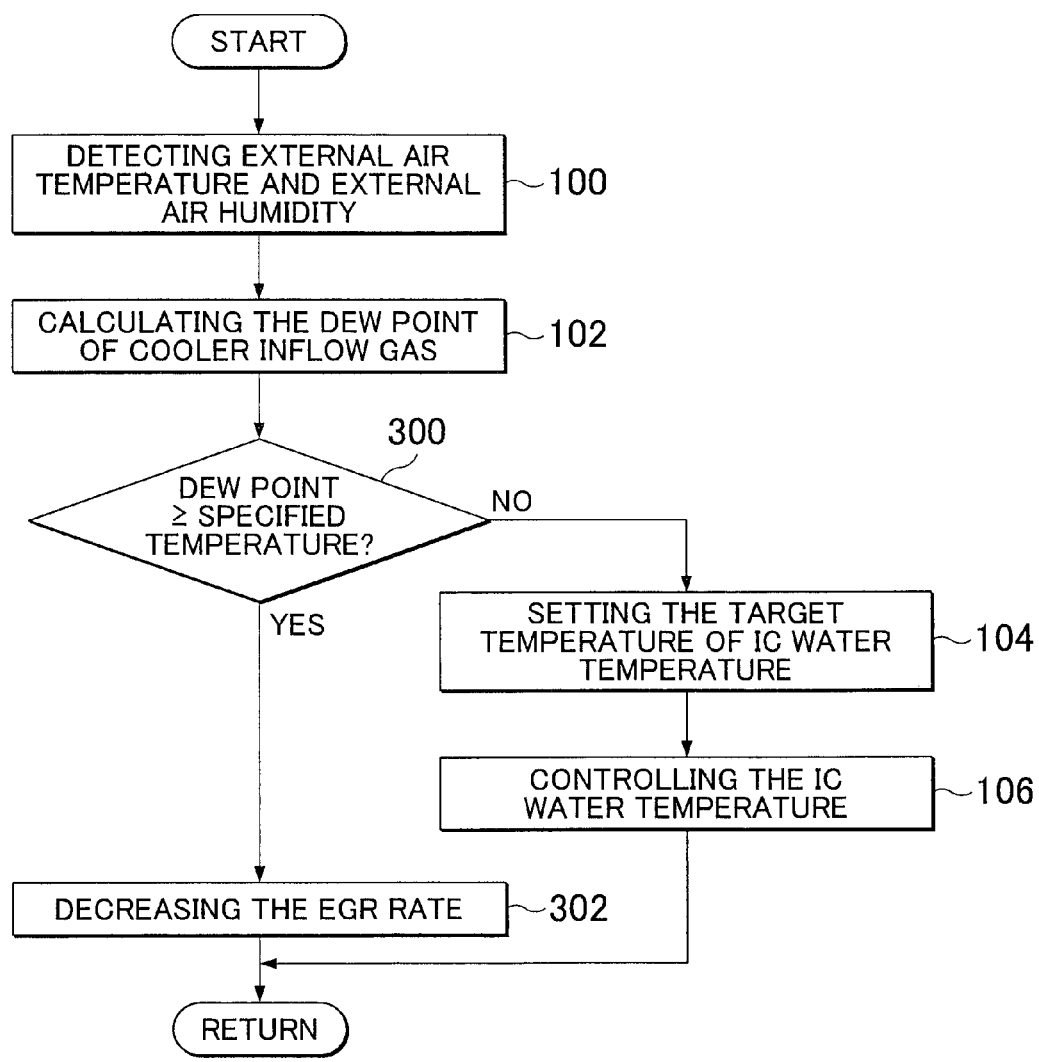
FIG. 11 is a flow chart of a routine executed in embodiment 3 of the present invention.

FIG. 11 is a flow chart showing a routine executed by the ECU 40 for implementing the control of features in embodiment 3 of the present invention. In addition, in FIG. 11, the same steps as the steps shown in FIG. 7 of embodiment 1 are indicated by the same reference signs to omit or simplify the description.

In the routine shown in FIG. 11, after obtaining the dew point of the cooler inflow gas corresponding to the external air state in step 102, the ECU 40 determines whether the obtained dew point is above a specified temperature (the temperature upper limit shown in FIG. 10) (step 300). In the case where the determination in step 300 is not established, the IC water temperature control in embodiment 1 is executed according to the process of steps 104 and 106.

On the other hand, in the case where the determination in step 300 is established, namely it is determined that the current external air temperature and external air humidity are in the corrosion worrying region of the core material, the ECU 40 then performs the correction of decreasing the EGR rate used in the current operating state relative to the value according to the EGR rate mapping, so as to decrease the dew point of the cooler inflow gas (step 302). Through such a correction, the EGR rate may be decreased by a specified amount relative to the value according to the EGR rate mapping or the EGR rate may be zero.

By adopting the above-mentioned routine shown in FIG. 11, when the current external air temperature and external air humidity enter into a high-temperature and humid state within the corrosion worrying region of the core material, the EGR rate is decreased, so that it not easy to form the condensed water, and over high IC water temperature is avoided, and corrosion of the core material can be inhibited.

In addition, as to each system of embodiments 1 to 3, as a structure for supplying heat to the low-temperature cooling water circulated in the intercooler cooling circuit 54 is described, a structure having the heat exchanger 68 for exchanging heat between the low-temperature cooling water and the high-temperature cooling water may be used. However, the structure for supplying heat to the low-temperature cooling water supplied to the intercooler 22 is not limited to the above-mentioned structure, and may be the following structure, for example.

Figure 12:
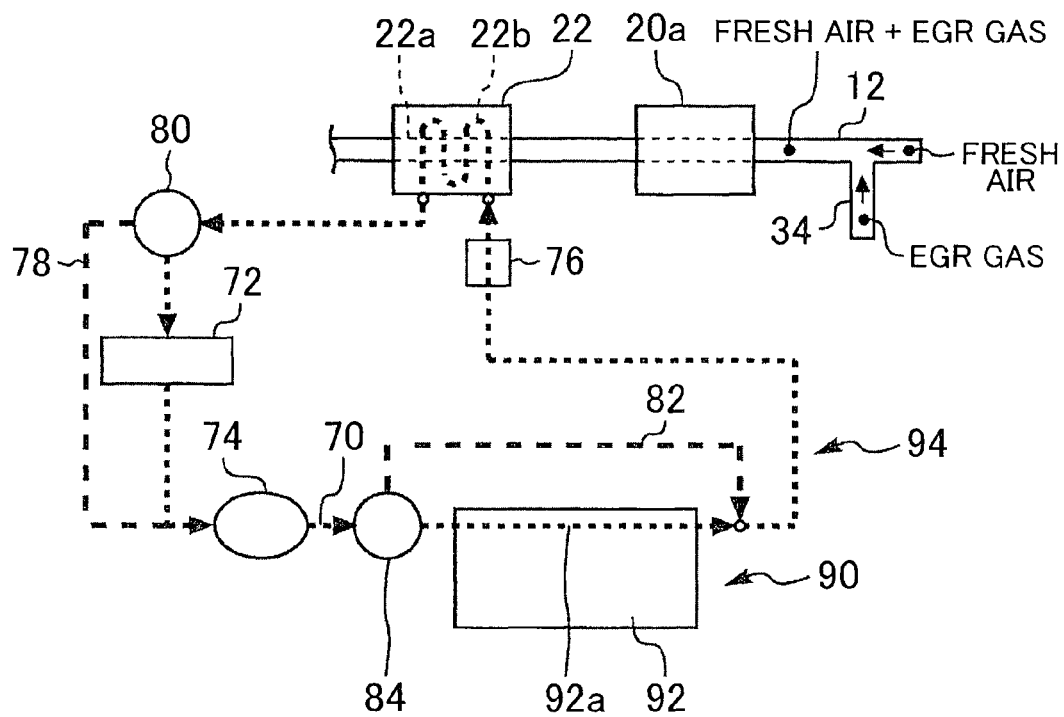
FIG. 12 is a diagram illustrating other structure for supplying heat to the low temperature cooling water.

FIG. 12 is a diagram for describing another structure for supplying heat to the low-temperature cooling water. In an internal combustion engine 90 shown in FIG. 12, a low-temperature cooling water passage 92a for circulating low-temperature cooling water is formed within a cylinder cover 92. In addition, in an intercooler cooling circuit 94 (equivalent to the "cooling water circuit" in the present invention) shown in FIG. 12, the low-temperature, cooling water passage 92a formed within the cylinder cover, the low-temperature cooling water circulating passage 70 and the internal cooling water passage 22b in the intercooler 22 form a closed circuit. By adopting such a structure, the low-temperature cooling water receives heat from the cylinder cover 92 when flowing through the low-temperature cooling water passage 92a formed within the cylinder cover. In addition, the member for supplying heat to the low-temperature cooling water is not limited to the cylinder cover 92, and also may be other member of the engine main body, such as a cylinder body.

Next, an embodiment 4 of the present invention will be described with reference to FIG. 13 to FIG. 15. The system of this embodiment substantially has the same hardware structure as the system of embodiment 1 and the like, except for an intercooler cooling circuit 100 substituting the intercooler cooling circuit 54 as shown in FIG. 2. Moreover, the control of embodiments 1 to 3 and the control described later are executed in this system.

Figure 13:
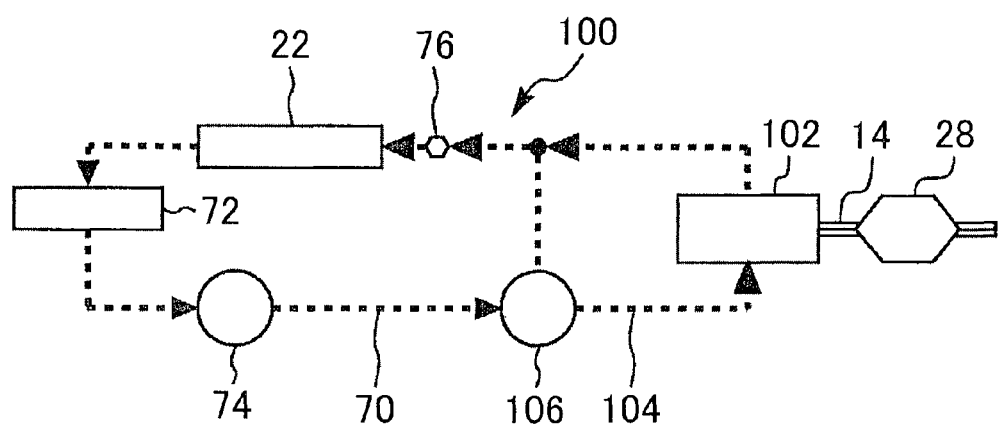
FIG. 13 is a diagram illustrating a structure of an intercooler cooling circuit used in embodiment 4 of the present invention.

FIG. 13 is a diagram for describing a structure of the intercooler cooling circuit 100 used in embodiment 4 of the present invention. In addition, in FIG. 13, elements which are the same as the elements in FIG. 2 are indicated by the same reference signs to omit or simplify the description.

The mentioned intercooler cooling circuit 54 serving as a structure for supplying heat to the low-temperature cooling water is provided with the heat exchanger 68 for exchanging heat between the low-temperature cooling water and the high-temperature cooling water. In the contrast, the intercooler cooling circuit 100 of this embodiment, as shown in FIG. 13, is provided with an exhaust gas heat exchanger 102 for exchanging heat between the low-temperature cooling water and the exhaust gas flowing in the exhaust passage 14. The exhaust gas heat exchanger 102 is mounted in an exhaust gas pipe constituting the exhaust passage 14 closer to the upstream side as compared with the S/C 28.

In more detail, the intercooler cooling circuit 100 is provided with a low-temperature cooling water bypass 104; and the low-temperature cooling water bypass 104 is branched from the low-temperature cooling water circulating passage 70 at a section between the downstream side (also the downstream side of the low-temperature side electric water pump 74 in this example) of the low-temperature side radiator 72 and the upstream side of the intercooler 22, and converges with the low-temperature cooling water circulating passage 70 again in the section. Moreover, the exhaust gas heat exchanger 102 is arranged in the midway of the low-temperature cooling water bypass 104. An electric three-way valve 106 is arranged at the end of the low-temperature cooling water bypass 104 on the upstream side (or the downstream side) of the exhaust gas heat exchanger 102. The three-way valve 106 is configured to switch the flow path pattern between a flow path pattern in which the low-temperature cooling water flows through the low-temperature cooling water bypass 104 so as to flow through the exhaust gas heat exchanger 102 and a flow path pattern in which the low-temperature cooling water does not flow through the exhaust gas heat exchanger 102. Moreover, the three-way valve 106 is electrically connected with the ECU 40, and the ECU 40 can control the ratio of the low-temperature cooling water distributed to the two flow pathes by controlling the opening degree of the three-way valve 106. By adopting the above structure, the low-temperature cooling water selectively exchanges heat with the exhaust gas as required.

By adopting the intercooler cooling circuit 100 with the above-mentioned structure, the temperature of the low-temperature cooling water can be increased by using exhaust gas heat. This is effective for preventing condensed water from being formed in the intercooler 22. However, when the exhaust gas heat is utilized for heating the low-temperature cooling water, the heat for preheating the catalyst such as the S/C 28 during cold start and the like is reduced. As a result, the preheating speed of the catalyst is decreased, so that the exhaust gas emission performance may be deteriorated.

Thus, in this embodiment, in the case where the catalyst temperature is lower than a specified value X1, the low-temperature cooling water is prohibited to be introduced into the exhaust gas heat exchanger 102. Thus, in the case where the catalyst temperature is relatively low, higher priority is given to the preheating of the catalyst as compared with the temperature rise of the low-temperature cooling water.

However, in the case where the preheating of the catalyst is given a higher priority during cold start and the like, preheating of the intercooler 22 may be delayed in time. Thus, in this embodiment, the temperature rise of the low-temperature cooling water caused by the exhaust gas heat is not completely prohibited until the preheating of the catalyst ends, but the following control is performed. That is, in the case where the catalyst temperature is above the specified value X1 and the temperature of the low-temperature cooling water is below a specified value X2, the opening degree of the three-way valve 106 is adjusted in view of the catalyst temperature and the temperature of the low-temperature cooling water so as to implement the temperature rise of the low-temperature cooling water by using the exhaust gas heat as far as possible. In addition, when the exhaust gas heat is predicted to increase (e.g. during accelerating), the priority of the preheating of catalyst is reduced, and the opening degree of the three-way valve 106 is adjusted so as to increase the flow rate of the low-temperature cooling water exchanging heat with the exhaust gas heat.

In addition, under the condition of low exhaust gas heat in the case of cold start and low load and the like, even if the exhaust gas heat is utilized, the low-temperature cooling water may also not be quickly heated. Thus, in this embodiment, when the temperature of the low-temperature cooling water in the exhaust gas heat exchanger 102 is lower than a specified value X3 (≤X2) when the load is low, in order that the low-temperature cooling water in the exhaust gas heat exchanger 102 is heated to above the specified value X3, an "engine low load control" for controlling the three-way valve 106 to prevent the low-temperature cooling water from flowing into the exhaust gas heat exchanger 102 is performed.

Figure 14:
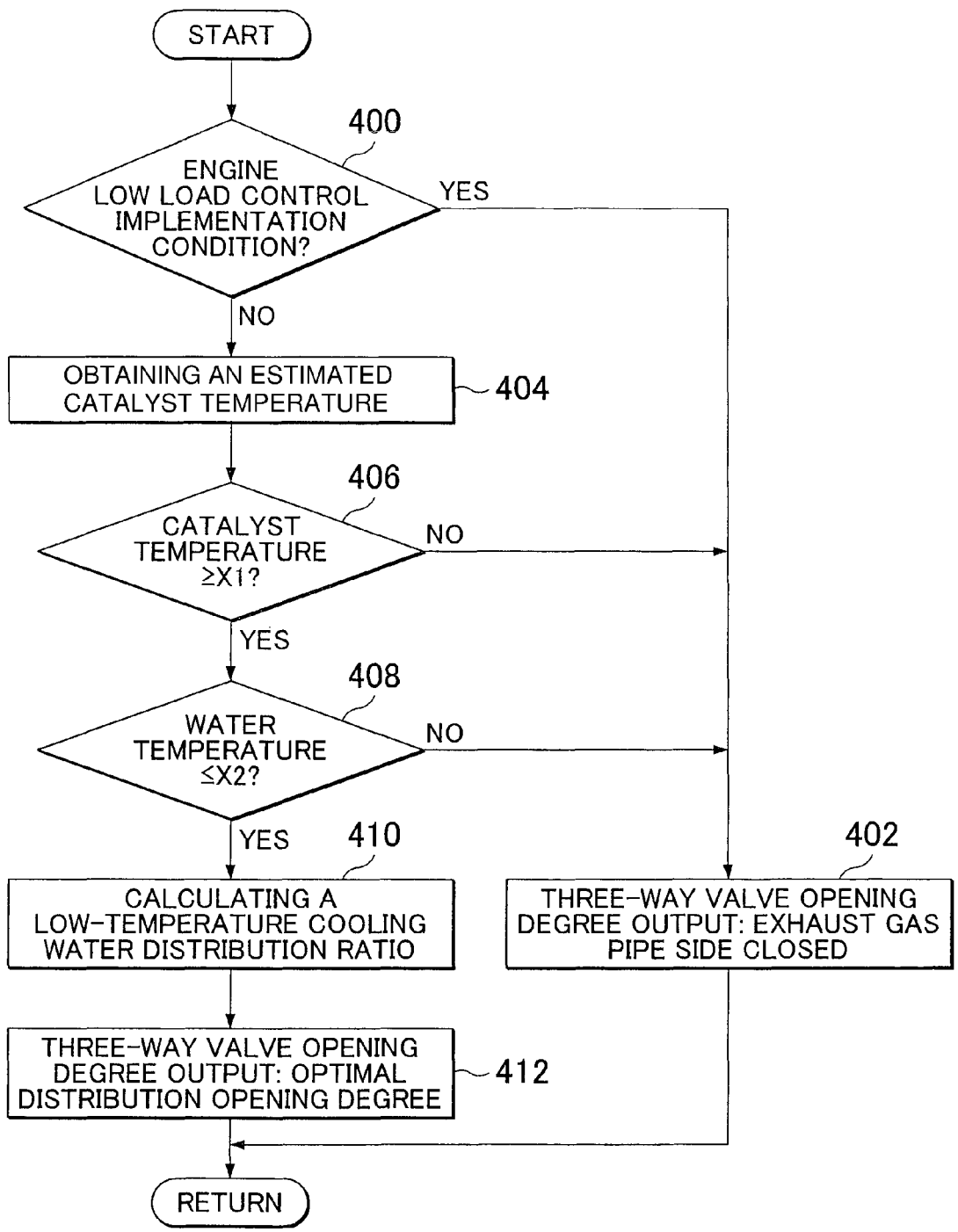
FIG. 14 is a flow chart of a routine executed in embodiment 4 of the present invention.

FIG. 14 is a flow chart showing a routine executed by the ECU 40 for executing the control in embodiment 4 of the present invention. In addition, the routine is repeatedly executed every specified control period.

In the routine shown in FIG. 14, the ECU 40 first determines whether the condition for implementing engine low load control is established (step 400). When the engine load state is a low load state and the temperature of the low-temperature cooling water in the exhaust gas heat exchanger 102 is lower than the specified value X3, the engine low load control is executed. In addition, the engine load state can be estimated on the basis of intake air amount. For example, the exhaust gas heat exchanger 102 may be provided with a temperature sensor, so that the temperature of the low-temperature cooling water in the exhaust gas heat exchanger 102 can be obtained.

When it is determined that the condition of executing the engine low load control is established in step 400, the ECU 40 controls the three-way valve 106, so as not to introduce the low-temperature cooling water into the exhaust gas heat exchanger 102 (step 402). Thus, the low-temperature cooling water in the exhaust gas heat exchanger 102 stops flowing, so that the low-temperature cooling water retained in the exhaust gas heat exchanger 102 is continuously heated by the exhaust gas heat.

On the other hand, when it is determined that the condition of executing the engine low load control is not established in step 400, the ECU 40 calculates the estimated catalyst (S/C 28) temperature (step 404). The catalyst temperature can be estimated on the basis of the integrated value of the intake air amount, for example. However, when the control of this embodiment is executed, the exhaust gas heat continuously exchanges heat with the low-temperature cooling water (namely the heat for preheating the catalyst is intermittently changed), so an error may occur when the catalyst temperature is estimated with a method based on the intake air amount. Thus, the catalyst temperature is obtained preferably by adopting the following method. That is, the heat exchange amount between the exhaust gas and the low-temperature cooling water is calculated for example on the basis of the flow rate of the low-temperature cooling water flowing through the exhaust gas heat exchanger 102, the controlled opening degree of the three-way valve 106 and the heat exchange efficiency of the exhaust gas heat exchanger 102. Moreover, the estimated value of the catalyst temperature is corrected according to the calculated heat exchange amount. Thus, a more accurate catalyst temperature can be obtained by taking the heat exchange between the exhaust gas and the low-temperature cooling water into consideration. Alternatively, the temperature of the catalyst can be directly measured by providing a temperature sensor.

Then, the ECU 40 determines whether the catalyst temperature estimate in step 404 is above the specified value X1 (step 406). As a result, in the case where the determination in step 406 is not established, step 402 is executed, and the low-temperature cooling water is prohibited to be introduced into the exhaust gas heat exchanger 102. On the other hand, in the case where the determination in step 406 is established, the ECU 40 determines whether the temperature of the low-temperature cooling water at the inlet of the intercooler 22 is below the specified value X2 by using the temperature sensor 76 (step 408).

In the case where the determination in step 408 is not established, namely in the case where the temperature of the low-temperature cooling water at the inlet of the intercooler 22 is relatively high, step 402 is executed, and the low-temperature cooling water is not introduced into the exhaust gas heat exchanger 102. On the other hand, in the case where the determination in step 408 is established, namely in the case where the catalyst temperature is above the temperature X1 and the temperature of the low-temperature cooling water is relatively low, step 410 is executed.

In step 410, the ECU 40 calculates a low-temperature cooling water distribution ratio. The low-temperature cooling water distribution ratio is a ratio between the flow rate of the low-temperature cooling water introduced into the exhaust gas heat exchanger 102 and the flow rate of the low-temperature cooling water circulated in the low-temperature cooling water circulating passage 70. In detail, in order that the low-temperature cooling water can be heated to the limit permitted by the catalyst preheating state, the higher the catalyst temperature is (namely, because great surplus exists in the preheating of the catalyst), the larger the low-temperature cooling water distribution ratio is; and the lower the temperature of the low-temperature cooling water is (because water temperature rise is required more strongly), the larger the low-temperature cooling water distribution ratio is. In addition, the low-temperature cooling water distribution ratio is set to be larger in an acceleration state than that in a non-acceleration state. In addition, the acceleration state can be estimated on the basis of the intake air amount and the opening degree of the throttle valve.

Next, the ECU 40 controls the three-way valve 106 to obtain the opening degree of the low-temperature cooling water distribution ratio as calculated in step 410 (step 412). The opening degree of the three-way valve 106 can be set by using a mapping (omitted in the figure) in which the opening degree of the three-way valve 106 is preset according to the relationship with the low-temperature cooling water distribution ratio. The opening degree of the three-way valve 106 can be controlled to an optimal distribution opening degree by taking both the preheating of the catalyst and temperature rise of the low-temperature cooling water into consideration by using the process in said step 412. In addition, in the case where the step 412 is executed so that the low-temperature cooling water flows in the exhaust gas heat exchanger 102 immediately after the above-mentioned engine low load control ends, the low-temperature cooling water heated in the exhaust gas heat exchanger 102 is supplied to the intercooler 22 when water circulation stops in the low load with a relatively low exhaust gas heat. Thus, the preheating property of the intercooler 22 can be improved.

Figure 15:
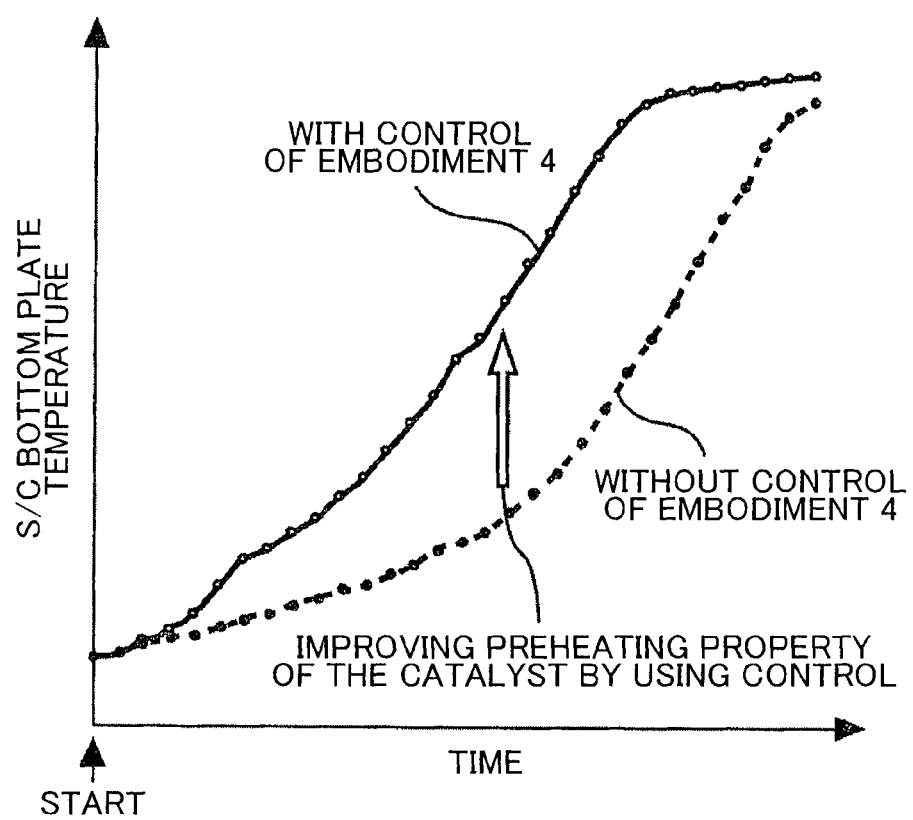
FIG. 15 is a diagram illustrating an effect achieved by the control of embodiment 4 of the present invention.

FIG. 15 is a diagram for describing an effect achieved by the control of embodiment 4 of the present invention. By adopting the control of this embodiment, in the case where the catalyst temperature (bottom plate temperature of the S/C 28) is lower than the specified value X1, the low-temperature cooling water is prohibited to be introduced into the exhaust gas heat exchanger 102. Preheating of the catalyst is given a higher priority than the temperature rise of the low-temperature cooling water by using this control, so that excellent catalyst preheating property can be ensured during cold start as shown in FIG. 15, and the temperature rise of the low-temperature cooling water can be obtained by using the exhaust gas heat so as to prevent the formation of the condensed water.

In addition, in the above-mentioned embodiment 4, the intercooler cooling circuit 100 is equivalent to a "cooling water circuit". In addition, the S/C 28 is equivalent to an "exhaust gas purification catalyst". In addition, a portion of the intercooler cooling circuit 100 is equivalent to a "third cooling water bypass". In addition, the ECU 40 realizes a "third flow path switcher" by controlling the three-way valve 106.

In addition, in the above-mentioned embodiments 1 to 4, description is made by taking the internal combustion engine 10 in which the EGR gas is introduced into the intake passage 12 closer to the upstream side as compared with the compressor 20a as an example. However, any internal combustion engine can be an object the present invention, as long as the internal combustion engine has a structure for introducing the EGR gas into the intake passage closer to the upstream side as compared with the intercooler, the internal combustion engine is not limited to the above-mentioned structure, and may also be an internal combustion engine with a structure for introducing the EGR gas into the intake passage from a location between the compressor and the intercooler.

In addition, in the above-mentioned embodiments 1 to 4, the following example in which the IC water temperature required for ensuring the specified power performance value (such as torque) in a state in which the external air temperature and the external air humidity become specified temperature and specified humidity respectively is used as a target temperature of the IC water temperature is described. However, the performance value adopted for specifying the target temperature of the cooling water in the intercooler of the present invention is not limited to the power performance value, and may be a specified performance value indicating the responsiveness (e.g. responsiveness of the torque) of the internal combustion engine when a driver of a vehicle depresses an accelerator pedal, for example.

In addition, in the above-mentioned embodiments 1 to 4, as the supercharger having the compressor 20a for supercharging the intake air, description is made by taking the turbocharger 20 using the exhaust gas energy as a driving force as an example. However, the supercharger in the present invention is not limited to the turbocharger. That is, as long as the intake air is supercharged by the compressor, the compressor in the present invention may use the power from a crankshaft of the internal combustion engine as the driving force, or use an electric motor as the driving force.

In addition, in the above-mentioned embodiments 1 to 4, as actuators used for controlling the temperature of the low-temperature cooling water, description is made by taking the three-way valves 80, 84 and 106 controlled by the ECU 40 as an example. However, the "water temperature control mechanism" in the present invention is not limited to the above-mentioned mechanism using the electronically controlled actuators, and may also adopt or combine actuators which are not electronically controlled such as a thermostat.

In addition, the object of the "cooling water circuit" in the present invention is not limited to the circuit configured to be different from the engine cooling circuit for cooling the engine main body such as the above-mentioned intercooler cooling circuit 54, and may also be a circuit sharing the cooling water with the engine cooling circuit.

What is claimed is:

1. A control device for an internal combustion engine, the control device comprising:
   a compressor arranged in an intake passage of the internal combustion engine, the compressor configured to supercharge gas flowing in the intake passage;
   a first cooling water circuit configured to circulate cooling water;
   an intercooler arranged in the intake passage closer to a downstream side as compared with the compressor, the intercooler configured to exchange heat between the gas flowing in the intake passage and the cooling water circulated in the first cooling water circuit;
   an EGR device configured to adjust an EGR rate of EGR gas for supplying a portion of exhaust gas flowing in an exhaust passage of the internal combustion engine to the intake passage closer to an upstream side as compared with the intercooler,
   an ECU configured to:
   (a) control the temperature of the cooling water of the intercooler to a target temperature in a specified external air state in which an external air temperature and an external air humidity are a specified temperature and a specified humidity, the target temperature being the temperature of the cooling water of the intercooler required for ensuring a specified performance in the specified external air state; and
   (b) control the EGR device based on an EGR rate mapping in which the EGR rate is set according to a relationship with parameters for determining an operating state of the internal combustion engine, the EGR rate mapping configured to set the EGR rate so that a dew point of cooler inflow gas flowing into the intercooler does not exceed the target temperature when the EGR gas is introduced by using the EGR device.

2. The control device according to claim 1, wherein, the parameters used in the EGR rate mapping are engine load and engine speed;
   the EGR rate mapping is configured to set the EGR rate with which the dew point of the cooler inflow gas is limited not to exceed the target temperature in a high load and high revolution speed operating region as a value of the EGR rate mapping.

3. The control device according to claim 1, wherein, the specified external air state is a high-temperature state or humid state or high-temperature and humid state in which condensed water tends to be provided in the intercooler.

4. The control device according to claim 1, further comprising:
   an external air temperature detector configured to detect or estimate the external air temperature; and
   an external air humidity detector configured to detect or estimate the external air humidity,
   wherein the ECU corrects the target temperature based on the dew point of the cooler inflow gas corresponding to the current external air temperature and the current external air humidity when the external air temperature and the external air humidity are different from the external air temperature and the external air humidity in the specified external air state.

5. The control device according to claim 4, wherein, the ECU controls the EGR device to the EGR rate lower than the EGR rate obtained from the EGR rate mapping when the external air temperature and the external air humidity are within a temperature and humidity region of external air where the dew point of the cooler inflow gas is above a specified temperature upper limit.

6. The control device according to claim 1, further comprising:
   a second cooling water circuit arranged separately from the first cooling water circuit and configured to cool the internal combustion engine by using a circulation water of the second cooling water circuit;
   a heat exchanger configured to exchange heat between the second cooling water circulated in the second cooling water circuit and the cooling water circulated in the first cooling water circuit;
   wherein the first cooling water circuit includes a radiator, a first cooling water bypass and a first flow path switcher, the radiator is configured to cool the cooling water, the first cooling water bypass is configured to bypass the radiator, and the first flow path switcher is configured to switch a flow path pattern of the cooling water between the flow path pattern in which the cooling water is introduced into the radiator and the flow path pattern in which the cooling water flows through the first cooling water bypass rather than the radiator.

7. The control device according to claim 1, further comprising:
   a second cooling water circuit arranged separately from the first cooling water circuit and configured to cool the internal combustion engine by using a circulation water of the second cooling water circuit; and
   a heat exchanger configured to exchange heat between the second cooling water circulated in the second cooling water circuit and the cooling water circulated in the first cooling water circuit;
   wherein the first cooling water circuit comprises a second cooling water bypass and a second flow path switcher, the second cooling water bypass is configured to bypass the heat exchanger, and the second flow path switcher is configured to switch the flow path pattern of the cooling water between a flow path pattern in which the cooling water is introduced into the heat exchanger and a flow path pattern in which the cooling water flows through the second cooling water bypass rather than the heat exchanger.

8. The control device according to claim 1, further comprising:
   a second cooling water circuit arranged separately from the first cooling water circuit and configured to cool the internal combustion engine by using a circulation water of the second cooling water circuit;
   a heat exchanger configured to exchange heat between the second cooling water circulated in the second cooling water circuit and the cooling water circulated in the first cooling water circuit;
   wherein, the second cooling water circuit comprises a water amount adjustor, the water amount adjuster adjusts an amount of the circulating water of the second cooling water circuit.

9. The control device according to claim 1, further comprising an adsorptive reduction type NOx catalyst provided in the exhaust passage of the internal combustion engine;
   wherein, the ECU is configured to:
   (c) execute a rich spike control in which an air-fuel ratio of gas flowing into the NOx catalyst is temporarily enriched during operation; and
   (d) control the EGR device to the EGR rate lower than the EGR rate obtained from the EGR rate mapping when the rich spike control is executed and the EGR gas is supplied to the intake passage by the EGR device.

10. The control device according to claim 1, further comprising:
    an exhaust gas heat exchanger configured to exchange heat between the exhaust gas flowing in the exhaust passage and the cooling water circulated in the first cooling water circuit; and
    an exhaust gas purification catalyst provided in the exhaust passage closer to a downstream side as compared with the exhaust gas heat exchanger;
    wherein the first cooling water circuit comprises a third cooling water bypass and a third flow path switcher, wherein the third cooling water bypass is configured to bypass the exhaust gas heat exchanger, the third flow path switcher is configured to switch the flow path pattern of the cooling water between the flow path pattern in which the cooling water is introduced into the exhaust gas heat exchanger and the flow path pattern in which the cooling water flows through the third cooling water bypass rather than the exhaust gas heat exchanger, and the ECU is configured to control the third flow path switcher so that the cooling water is prohibited to be introduced into the exhaust gas heat exchanger in the case where the temperature of the exhaust gas purification catalyst is lower than a specified value.

* * * * *